US011262208B2

(12) United States Patent
Fowe et al.

(10) Patent No.: US 11,262,208 B2
(45) Date of Patent: Mar. 1, 2022

(54) LANE LEVEL ROUTING AND NAVIGATION USING LANE LEVEL DYNAMIC PROFILES

(71) Applicant: HERE Global B.V., Eindhoven (NL)

(72) Inventors: James Fowe, Chicago, IL (US); Aditya Balasaheb Jadhav, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 169 days.

(21) Appl. No.: 16/587,876

(22) Filed: Sep. 30, 2019

(65) Prior Publication Data
US 2021/0095990 A1 Apr. 1, 2021

(51) Int. Cl.
G01C 21/36 (2006.01)
G01C 21/34 (2006.01)

(52) U.S. Cl.
CPC ..... G01C 21/3691 (2013.01); G01C 21/3446 (2013.01); G01C 21/3461 (2013.01)

(58) Field of Classification Search
None
See application file for complete search history.

(56) References Cited

U.S. PATENT DOCUMENTS

| | | | |
|---|---|---|---|
| 9,721,472 B2 | 8/2017 | Jain et al. | |
| 2013/0275033 A1* | 10/2013 | Bastiaensen | G01C 21/26 701/119 |
| 2014/0278052 A1* | 9/2014 | Slavin | G08G 1/0129 701/400 |
| 2016/0238404 A1* | 8/2016 | Okada | G01C 21/3446 |
| 2017/0084178 A1* | 3/2017 | Jain | G08G 1/096827 |
| 2017/0089717 A1 | 3/2017 | White et al. | |
| 2018/0182238 A1 | 6/2018 | Fowe et al. | |
| 2018/0273032 A1* | 9/2018 | Yang | G05D 1/0088 |
| 2019/0086226 A1 | 3/2019 | Hamada et al. | |
| 2019/0120640 A1* | 4/2019 | Ho | G01C 21/3453 |
| 2020/0004268 A1* | 1/2020 | Park | G01C 21/32 |
| 2020/0348408 A1* | 11/2020 | Peng | G01S 13/931 |
| 2020/0377128 A1* | 12/2020 | Marczuk | G08G 1/096838 |

OTHER PUBLICATIONS

Jiang, Kun et al. A Flexible Multi-Layer Map Model Designed For Lane-Level Route Planning In Autonomous Vehicles, Engineering, vol. 5, No. 2, pp. 305-318, Apr. 1, 2019.

* cited by examiner

Primary Examiner — Khoi H Tran
Assistant Examiner — Tristan J Greiner
(74) Attorney, Agent, or Firm — Alston & Bird LLP

(57) ABSTRACT

One or more lane level dynamic profiles are received. Each lane level dynamic profile comprises at least one dynamic parameter corresponding to a lane of a traversable network. A lane level network graph is received for at least a portion of the traversable network. A cost is assigned to the lane based on the at least one dynamic parameter corresponding to the lane. A routing or navigation function is performed using the cost assigned to the lane and the lane level network graph to generate routing information. The routing information is provided such that a mobile apparatus receives the routing information.

20 Claims, 12 Drawing Sheets

LANE LEVEL ROUTING AND NAVIGATION USING LANE LEVEL DYNAMIC PROFILES

TECHNOLOGICAL FIELD

An example embodiment relates generally to lane lever routing and navigation. An example embodiment relates generally to generating and using lane level dynamic profiles in performing lane level routing and navigation.

BACKGROUND

Traffic conditions along different lanes of a road segment may vary significantly. For example, a lane of traffic turning left at an intersection may have a different traffic profile than a lane of traffic continuing forward through the intersection. Traditionally, routing and navigation functions are performed on a segment level and therefore cannot account for the differences in conditions between lanes of the same road segment.

BRIEF SUMMARY OF SOME EXAMPLE EMBODIMENTS

Various embodiments are directed to performing lane level routing and navigation. In various embodiments, a lane level dynamic profile (LLDP) is used to perform the lane level routing; navigation; provision of warnings, alerts, and/or notifications; and/or the like. In an example embodiment, an LLDP comprises LLDP information/data that describes one or more dynamic parameters for each of one or more lanes of a traversable network and/or portion thereof. For example, the one or more dynamic parameters may include a representative speed, a sudden braking index, a sudden action index (and/or action index), an incident rate/frequency, a traffic volume, information/data regarding a lane closure, and/or the like. As used herein, a sudden action index for a first lane is a representation of the frequency and intensity of decelerations exhibited along a first lane and the frequency of sudden lane changes into and/or out of the first lane. An action index for a first lane is determined based on the frequency and intensity of decelerations along a first lane and the first epoch and the frequency of lane changes into and/or out of the first lane. Various embodiments use historical LLDP information/data that describes historical dynamic parameters during a particular epoch as determined based on historical probe information/data. In an example embodiment, an epoch is a predetermined portion of a day, a week, a year, and/or the like. In an example embodiment, an example epoch may be from 2:00:00 am to 2:14:59 am. In another example embodiment, an example epoch is 2:00:00 am to 2:04:59 am on Monday. In still another example embodiment, an example epoch is 2:00:00 am to 2:19:59 am on 22 August. Various embodiments use real-time LLDP information/data that describes real-time (or near real-time) dynamic parameters as determined based on current probe information/data. Various embodiments may use a combination of historical and real-time LLDP information/data for performing lane level routing and navigation.

As noted above, LLDP information/data may be determined based on probe information/data. For example, a network apparatus may receive probe information/data generated by one or more probe apparatuses as the probe apparatuses traverse at least a portion of the traversable network. In an example embodiment, a probe apparatus is onboard and/or physically coupled to a vehicle. In an example embodiment, an instance of probe information/data comprises location information/data indicating a location of the probe apparatus when the instance of probe information/data was generated and/or captured, a timestamp indicating the time at which the instance of probe information/data was generated and/or captured, a trajectory identifier configured to enable the linking of instances of probe information/data into vehicle trajectories while still, in some embodiments, maintaining the anonymity of the probe apparatus and/or a vehicle the probe apparatus is onboard. In various embodiments, an instance of probe information/data may include various other information/data corresponding to sensor information/data generated and/or captured by one or more sensors of the probe apparatus, in communication with the probe apparatus, onboard the vehicle, and/or the like and/or analysis of the sensor information/data.

In various embodiments, a network apparatus receives a plurality of instances of probe information/data corresponding to a plurality of probe apparatus trajectories through at least portions of the traversable network. In various embodiments, the network apparatus performs lane level map matching for one or more instances of probe information/data. In an example embodiment, an epoch corresponding to the probe information/data may be identified. The instances of probe information/data corresponding to a particular lane of the traversable network may be used to generate sub-trajectories corresponding to portions of probe apparatus trajectories that are along the particular lane. The sub-trajectories may be generated by time-ordering instances of probe information/data having the same trajectory identifier that were map-matched to the particular lane. The sub-trajectories may then be analyzed to determine dynamic parameters corresponding to the particular lane and/or epoch. In an example embodiment, the sub-trajectories and/or aspects thereof may be aggregated to determine dynamic parameters corresponding to the particular lane and/or epoch. For example, a representative speed corresponding to the particular lane and/or epoch may be determined. In an example embodiment, a sudden braking index corresponding to the particular lane and/or epoch may be determined. In an example embodiment, a sudden action index (and/or action index) corresponding to the particular lane and/or epoch may be determined. In an example embodiment, a lane closure corresponding to the particular lane may be identified and the corresponding lane level network graph may be updated. In various embodiments, the lane level network graph may be updated to include and/or be based on the LLDP information/data.

In various embodiments, the network apparatus may receive a routing information/data request. For example, a mobile apparatus may generate and provide a routing information/data request to request navigation and/or route information/data such as a route (e.g., from an origin to a destination), traffic information/data, lane level information/data for one or more upcoming maneuvers, and/or the like. The network apparatus may use the LLDP information/data and/or a portion thereof to determine a cost associated with one or more lanes. The cost associated with the one or more lanes may then be used in a cost-based routing and/or path finding algorithm. For example, an A* algorithm may be used to determine a route (e.g., from an origin to a destination) and/or the like based on costs associated with lanes of a traversable network, wherein the costs are determined from, generated based on, and/or are included in the LLDP information/data corresponding to the lanes. In various embodiments, the LLDP information/data used in determining the route and/or the like is historical LLDP information/data and/or real-time (and/or near real-time) LLDP information/data.

The network apparatus may then generate and provide a response to the routing information/data request. For example, the network apparatus may generate a response to the routing information/data request that provides the route (e.g., form the origin to the destination), traffic information/data, lane level information/data for one or more upcoming maneuvers, and/or the like requested in the routing information/data request. The network apparatus may then provide a response to the routing information/data request such that the mobile apparatus receives the response and may use information/data included therein to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data and/or warnings, vehicle trajectory determination and/or guidance, vehicle speed and/or handling control, route and/or maneuver visualization, provision of safety alerts, and/or the like.

Example embodiments of the present invention provide technical improvements to the navigation arts by providing dynamic lane level information/data. As noted above, traditionally routing and navigation functions are performed at the segment level. However, various parameters of corresponding to a first lane of a road segment may be significantly different from corresponding parameters of a second lane of the same road segment. For example, a left turn lane of a road segment may have quite different parameters, at least part of the time, compared to a forward continuing lane. These parameters may be dynamic based on traffic patterns, traffic incidents, and/or the like. Example embodiments enable these dynamic parameters to be taken into account in various lane level routing and navigation functions by using the dynamic parameters as a cost metric and/or to inform a cost metric used to assign a cost to a lane of a traversable network for use in cost-based routing and/or a path finding algorithm. Thus, various embodiments provide technical solutions for improved routing and navigation.

In various embodiments, a network apparatus receives one or more lane level dynamic profiles. Each lane level dynamic profile comprises at least one dynamic parameter corresponding to a lane of a traversable network. The network apparatus receives a lane level network graph for at least a portion of the traversable network. The network apparatus assigns a cost to the lane based on the at least one dynamic parameter corresponding to the lane. The network apparatus performs a routing or navigation function using the cost assigned to the lane and the lane level network graph to generate routing information. The network apparatus provides the routing information such that a mobile apparatus receives the routing information.

In accordance with an example embodiment, a method for performing a routing and/or navigation function based on an LLDP is provided. In an example embodiment, the method comprises receiving, by processing circuitry of a network apparatus, one or more lane level dynamic profile. Each lane level dynamic profile comprises at least one dynamic parameter corresponding to at least one lane of a traversable network. The method further comprises receiving, by the processing circuitry, a lane level network graph for at least a portion of the traversable network and assigning, by the processing circuitry, a cost to the at least one lane based on the at least one dynamic parameter corresponding to the at least one lane. The method further comprises performing, by the processing circuitry, a routing or navigation function using the cost assigned to the at least one lane and the lane level network graph to generate routing information; and providing, by the network apparatus, the routing information such that a mobile apparatus receives the routing information.

In an example embodiment, the method further comprises receiving a routing information request from the mobile apparatus, wherein the routing or navigation function is performed based on the routing information request. In an example embodiment, the method further comprises receiving real-time or near real-time traffic information; and modifying the lane level network graph based on the real-time or near real-time traffic information, wherein the routing or navigation function is performed based on the modified lane level network graph. In an example embodiment, the at least one dynamic parameter comprises at least one of (a) a representative speed, (b) a sudden braking index, (c) a sudden action index, or (d) an action index. In an example embodiment, the lane level dynamic profile is determined based on at least one of (a) historical probe information corresponding to an epoch corresponding to a current time or (b) real-time or near real-time probe information corresponding to a sliding time window corresponding to the current time. In an example embodiment, the routing or navigation function comprises determining a lane level route from an origin location to a destination location. In an example embodiment, performing the routing or navigation function comprises using a cost-based routing or path-finding algorithm. In an example embodiment, the cost-based routing or path-finding algorithm is an A* algorithm. In an example embodiment, the at least one dynamic parameter comprises a sudden braking index and determining the sudden braking index includes performing a clustering analysis of sub-trajectories corresponding to the at least one lane to identify sudden braking lane sections. In an example embodiment, the routing information comprises information identifying a location of a sudden braking lane section.

In accordance with an example embodiment, an apparatus is provided. In an example embodiment, the apparatus comprises at least one processor, a communications interface configured for communicating via at least one network, and at least one memory storing computer program code. The at least one memory and the computer program code are configured to, with the processor, cause the apparatus to at least receive one or more lane level dynamic profile. Each lane level dynamic profile comprises at least one dynamic parameter corresponding to at least one lane of a traversable network. The at least one memory and the computer program code are further configured to, with the processor, cause the apparatus to at least receive a lane level network graph for at least a portion of the traversable network; assign a cost to the at least one lane based on the at least one dynamic parameter corresponding to the at least one lane; perform a routing or navigation function using the cost assigned to the at least one lane and the lane level network graph to generate routing information; and provide the routing information such that a mobile apparatus receives the routing information.

In an example embodiment, the at least one memory and the computer program code are further configured to, with the processor, cause the apparatus to at least receive a routing information request from the mobile apparatus, wherein the routing or navigation function is performed based on the routing information request. In an example embodiment, the at least one memory and the computer program code are further configured to, with the processor, cause the apparatus to at least receive real-time or near real-time traffic information; and modify the lane level network graph based on the real-time or near real-time traffic information, wherein the routing or navigation function is performed based on the modified lane level network graph. In an example embodiment, the at least one dynamic parameter comprises at least one of (a) a representative speed, (b) a sudden braking index, (c) a sudden action index, or (d) an action index. In an example embodiment, the lane level dynamic profile is determined based on at least one of (a) historical probe information corresponding to an epoch corresponding to a current time or (b) real-time or near real-time probe information corresponding to a sliding time window corresponding to the current time. In an example embodiment, the routing or navigation function comprises determining a lane level route from an origin location to a destination location. In an example embodiment, performing the routing or navigation function comprises using a cost-based routing or path-finding algorithm. In an example embodiment, the cost-based routing or path-finding algorithm is an A* algorithm. In an example embodiment, the at least one dynamic parameter comprises a sudden braking index and determining the sudden braking index includes performing a clustering analysis of sub-trajectories corresponding to the at least one lane to identify sudden braking lane sections. In an example embodiment, the routing information comprises information identifying a location of a sudden braking lane section.

In accordance with an example embodiment, a computer program product is provided that comprises at least one non-transitory computer-readable storage medium having computer-executable program code instructions stored therein. The computer-executable program code instructions comprise program code instructions that are configured, when executed by a processor of an apparatus, to cause the apparatus to receive one or more lane level dynamic profile. Each lane level dynamic profile comprises at least one dynamic parameter corresponding to at least one lane of a traversable network. The computer-executable program code instructions further comprise program code instructions that are configured, when executed by a processor of an apparatus, to cause the apparatus to receive a lane level network graph for at least a portion of the traversable network; assign a cost to the at least one lane based on the at least one dynamic parameter corresponding to the at least one lane; perform a routing or navigation function using the cost assigned to the at least one lane and the lane level network graph to generate routing information; and provide the routing information such that a mobile apparatus receives the routing information.

In an example embodiment, the computer-executable program code instructions further comprise program code instructions that are configured, when executed by a processor of an apparatus, to cause the apparatus to receive a routing information request from the mobile apparatus, wherein the routing or navigation function is performed based on the routing information request. In an example embodiment, the computer-executable program code instructions further comprise program code instructions that are configured, when executed by a processor of an apparatus, to cause the apparatus to receive real-time or near real-time traffic information; and modify the lane level network graph based on the real-time or near real-time traffic information, wherein the routing or navigation function is performed based on the modified lane level network graph. In an example embodiment, the at least one dynamic parameter comprises a representative speed or a sudden braking index. In an example embodiment, the lane level dynamic profile is determined based on at least one of (a) historical probe information corresponding to an epoch corresponding to a current time or (b) real-time or near real-time probe information corresponding to a sliding time window corresponding to the current time. In an example embodiment, the routing or navigation function comprises determining a lane level route from an origin location to a destination location. In an example embodiment, performing the routing or navigation function comprises using a cost-based routing or path-finding algorithm. In an example embodiment, the cost-based routing or path-finding algorithm is an A* algorithm. In an example embodiment, the at least one dynamic parameter comprises a sudden braking index and determining the sudden braking index includes performing a clustering analysis of sub-trajectories corresponding to the at least one lane to identify sudden braking lane sections. In an example embodiment, the routing information comprises information identifying a location of a sudden braking lane section.

In accordance with yet another example embodiment of the present invention, an apparatus is provided that comprises means for receiving one or more lane level dynamic profile. Each lane level dynamic profile comprises at least one dynamic parameter corresponding to at least one lane of a traversable network. The apparatus comprises means for receiving a lane level network graph for at least a portion of the traversable network. The apparatus comprises means for assigning a cost to the at least one lane based on the at least one dynamic parameter corresponding to the at least one lane. The apparatus comprises means for performing a routing or navigation function using the cost assigned to the at least one lane and the lane level network graph to generate routing information. The apparatus comprises means for providing the routing information such that a mobile apparatus receives the routing information.

BRIEF DESCRIPTION OF THE DRAWINGS

Figure 1:
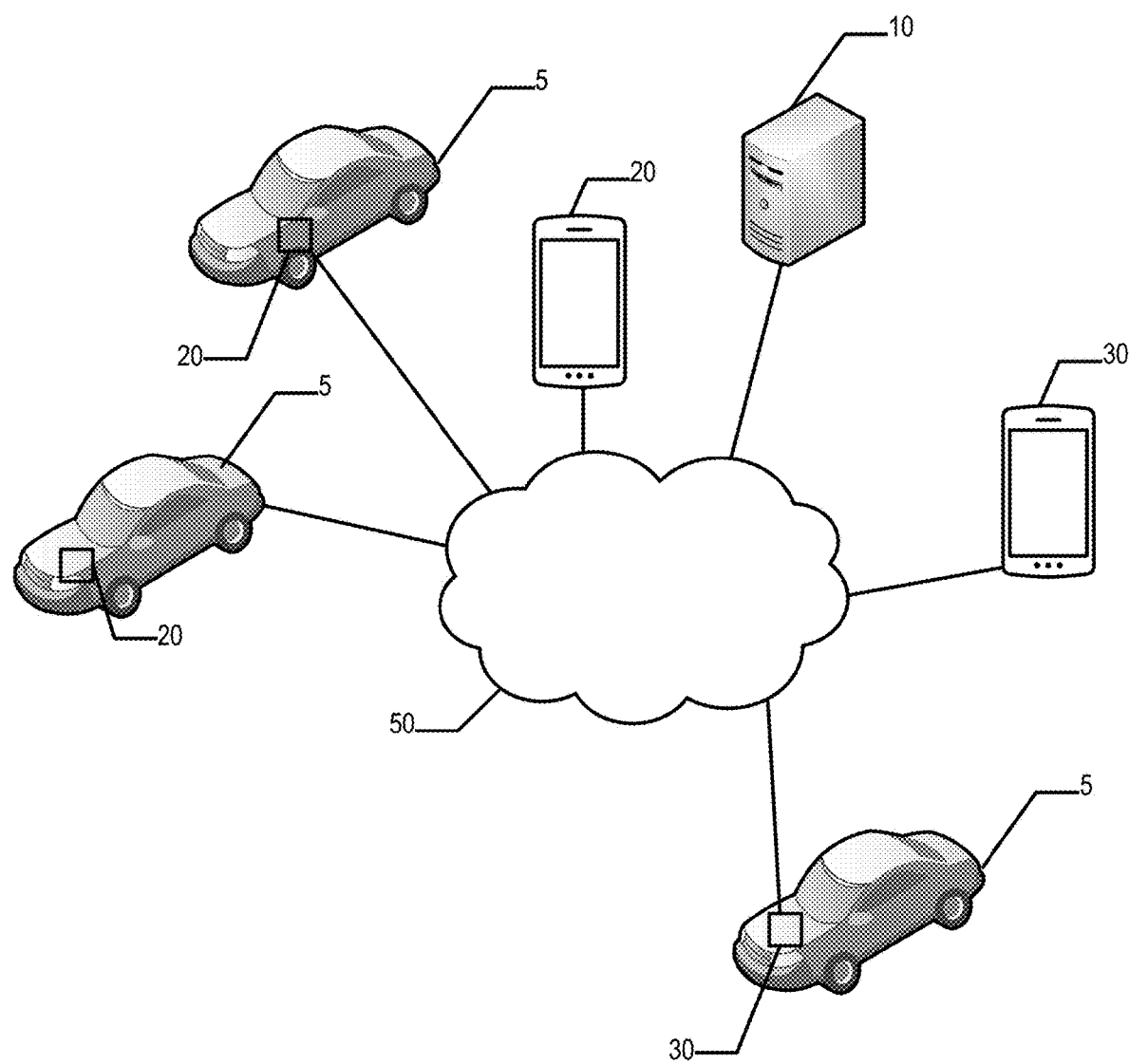
Figure 2A:
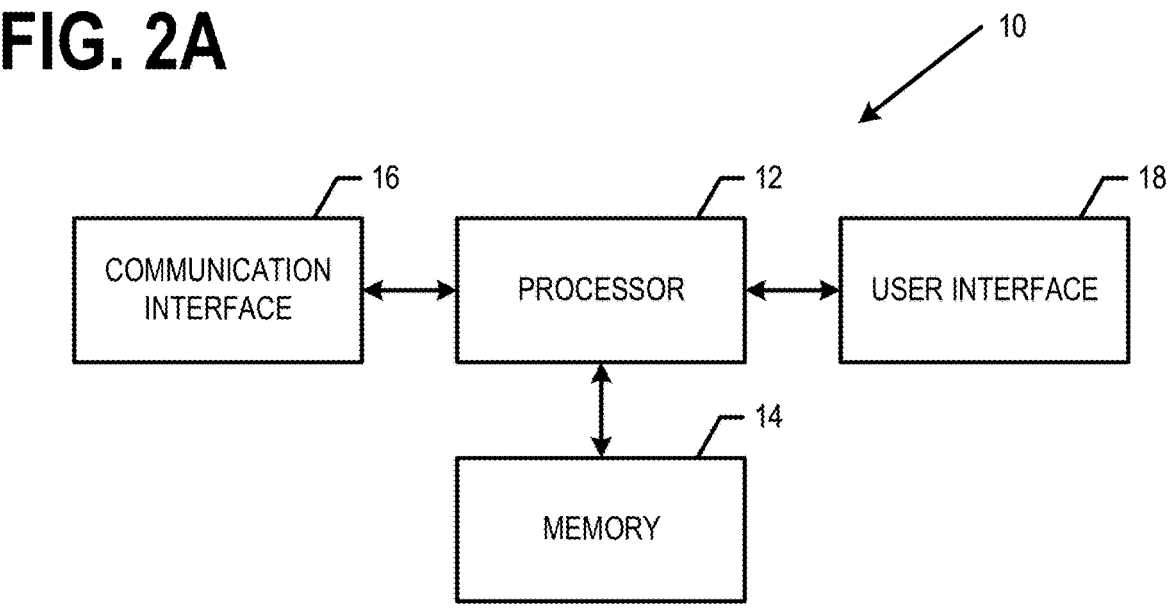
Figure 2B:
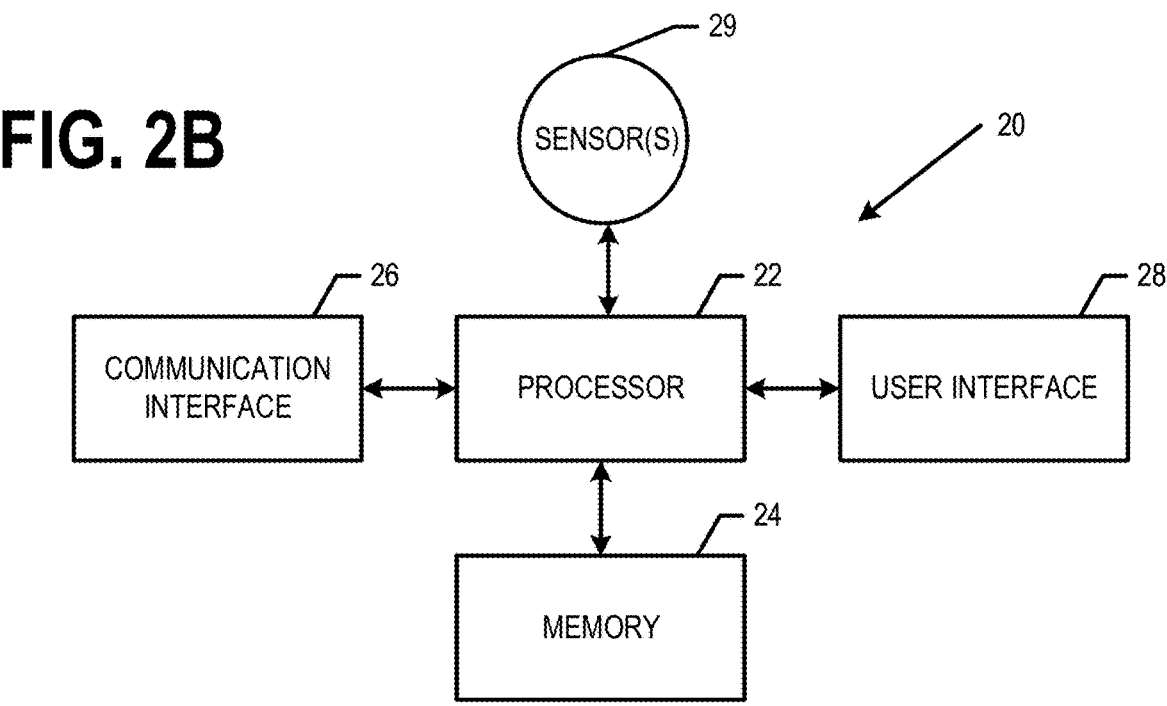
Figure 2C:
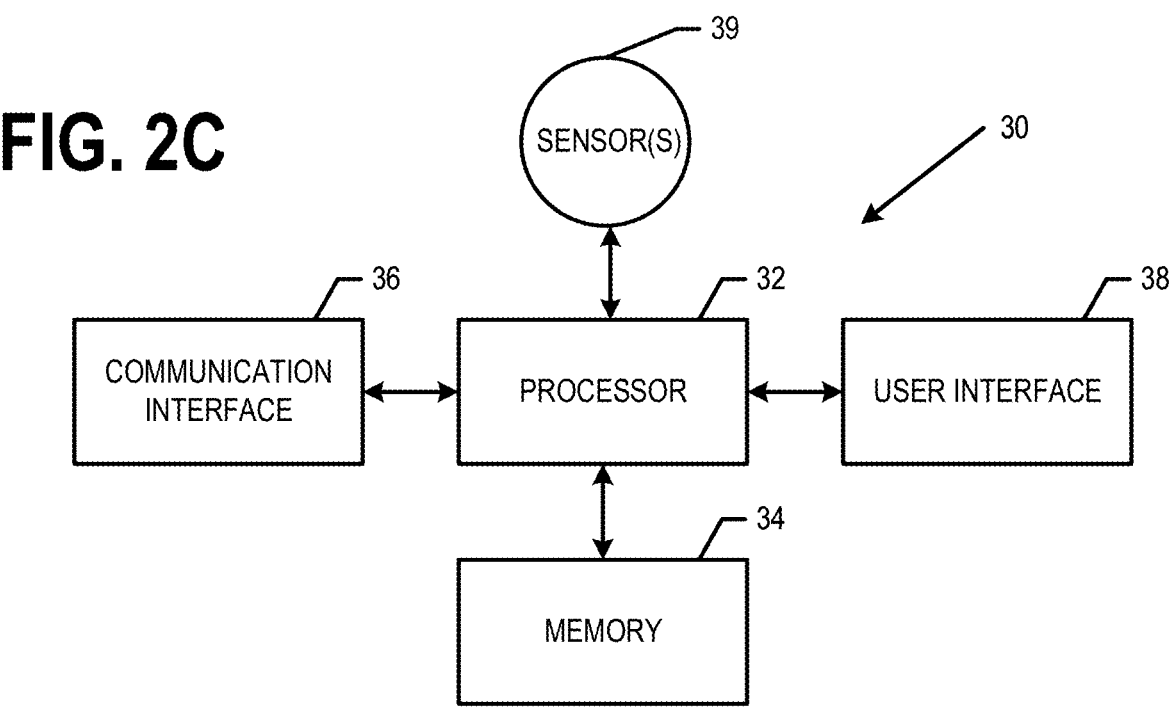
Figure 3:
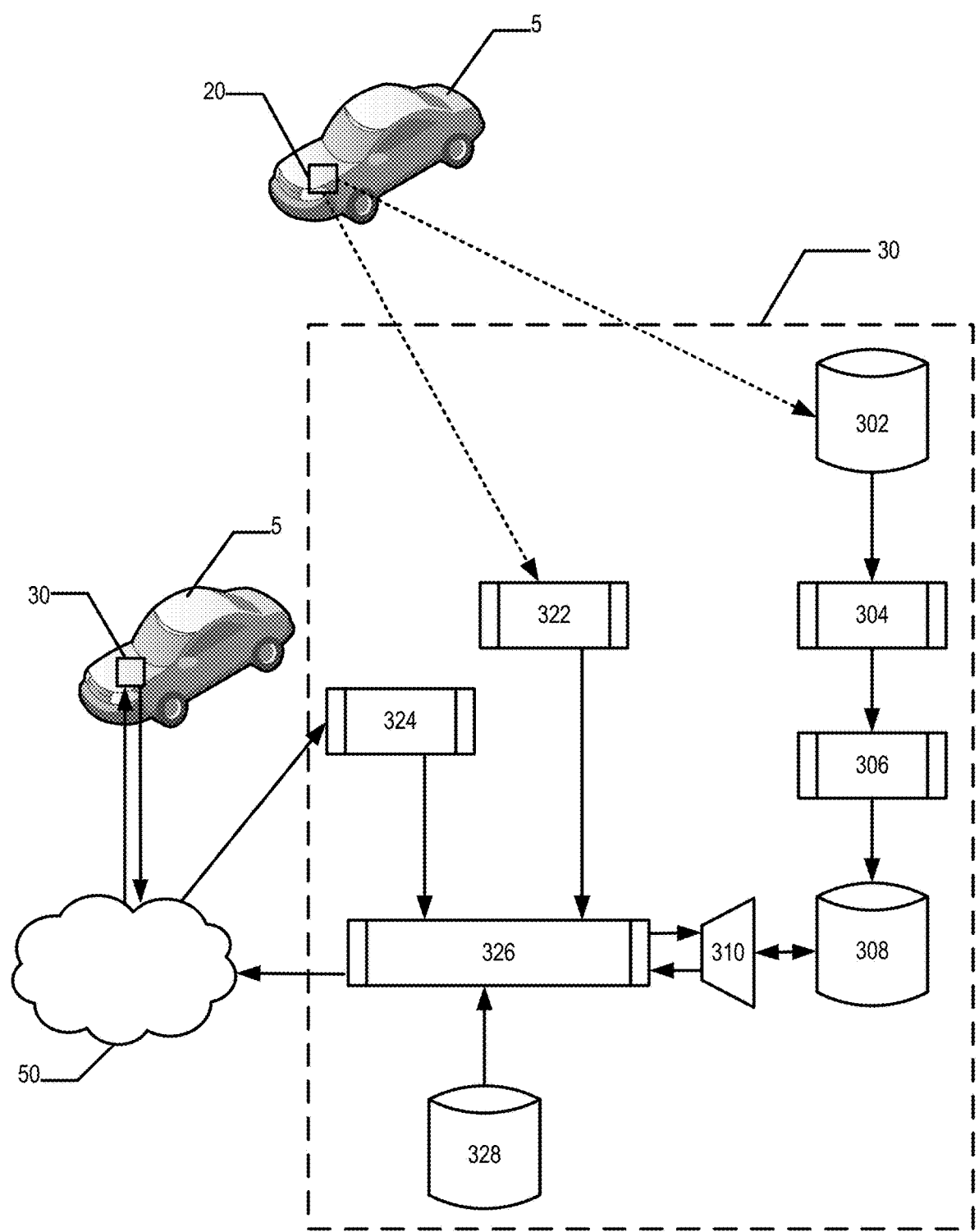
Figure 4A:
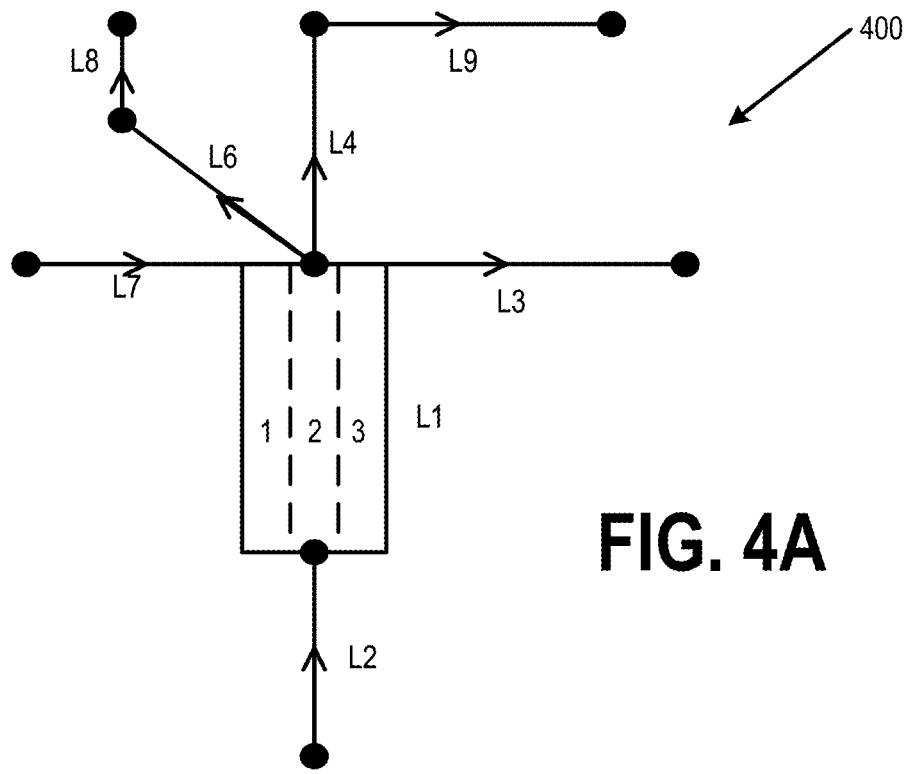
Figure 4B:
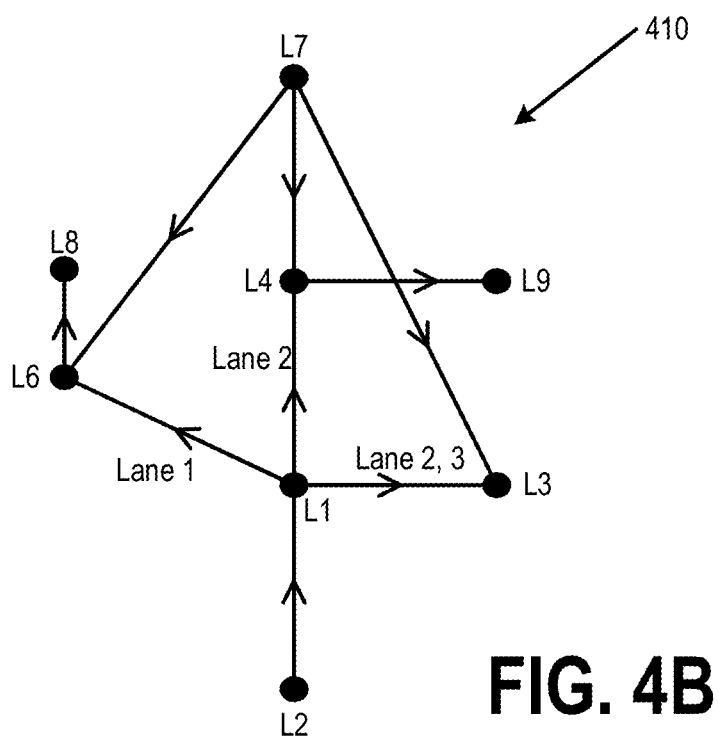
Figure 5A:
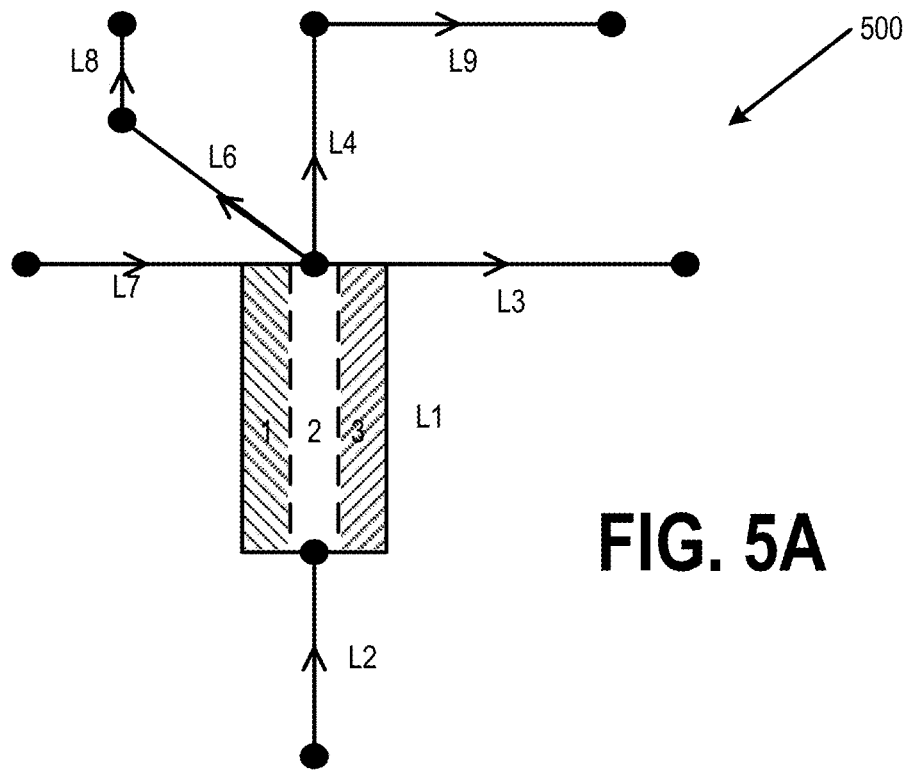
Figure 5B:
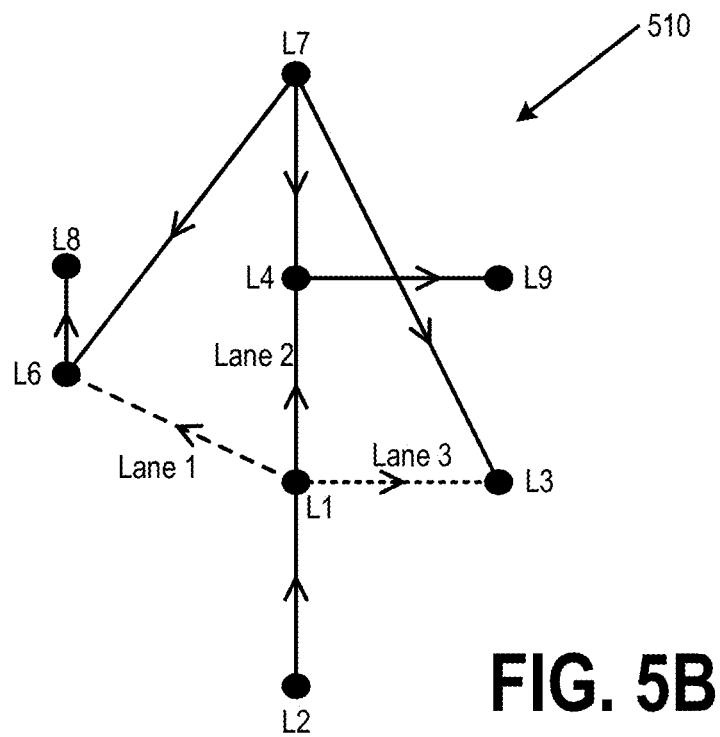
Figure 6A:
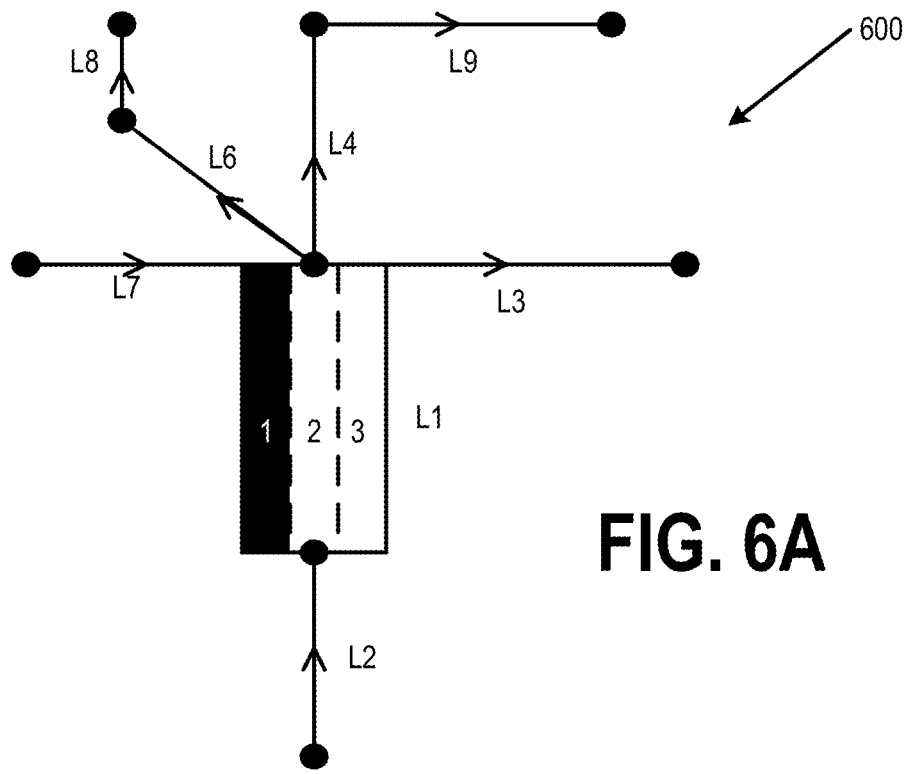
Figure 6B:
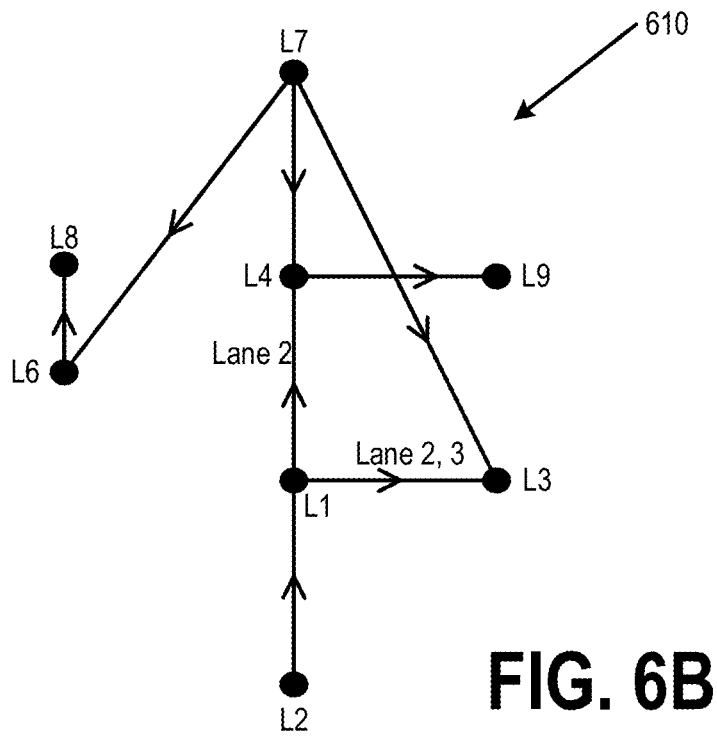
Figure 7:
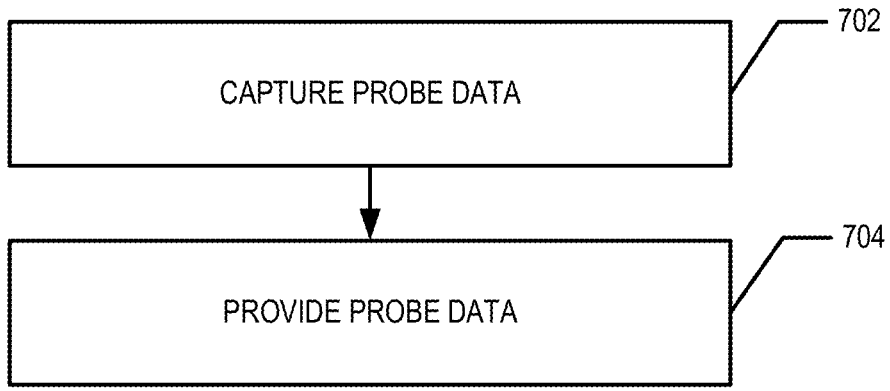
Figure 8:
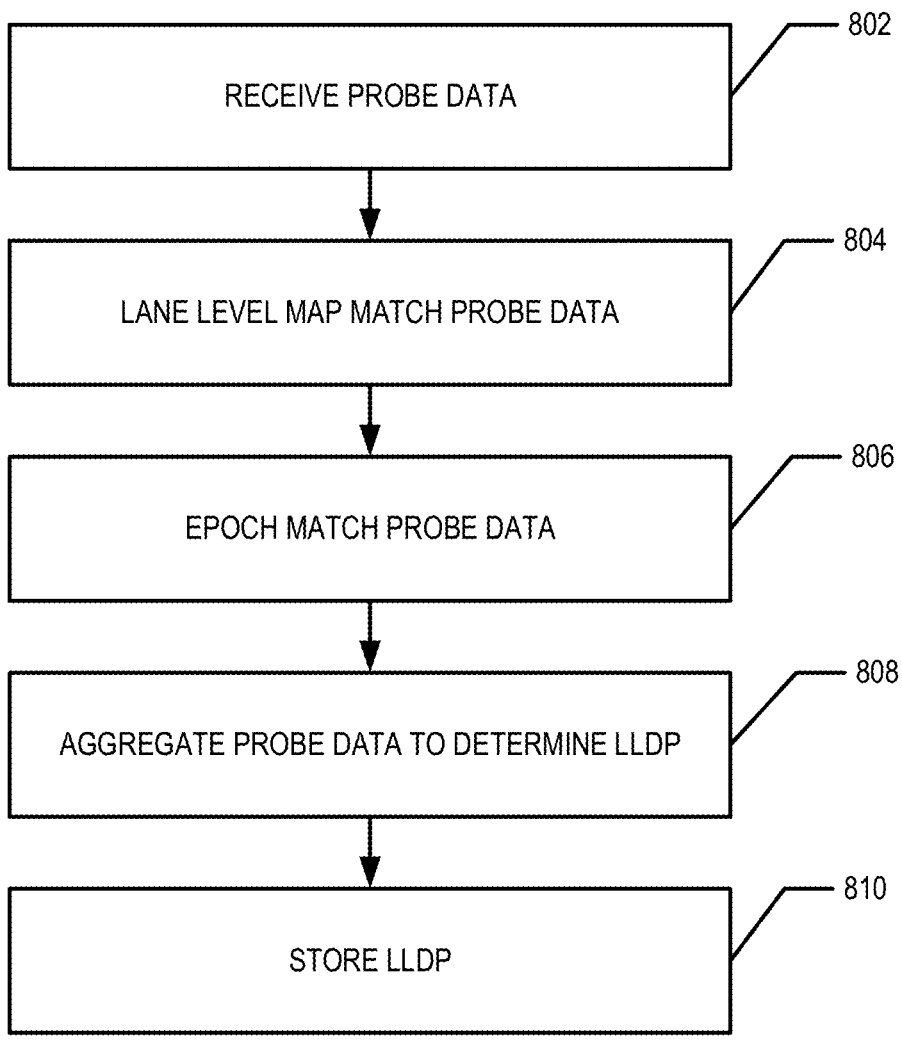
Figure 9:
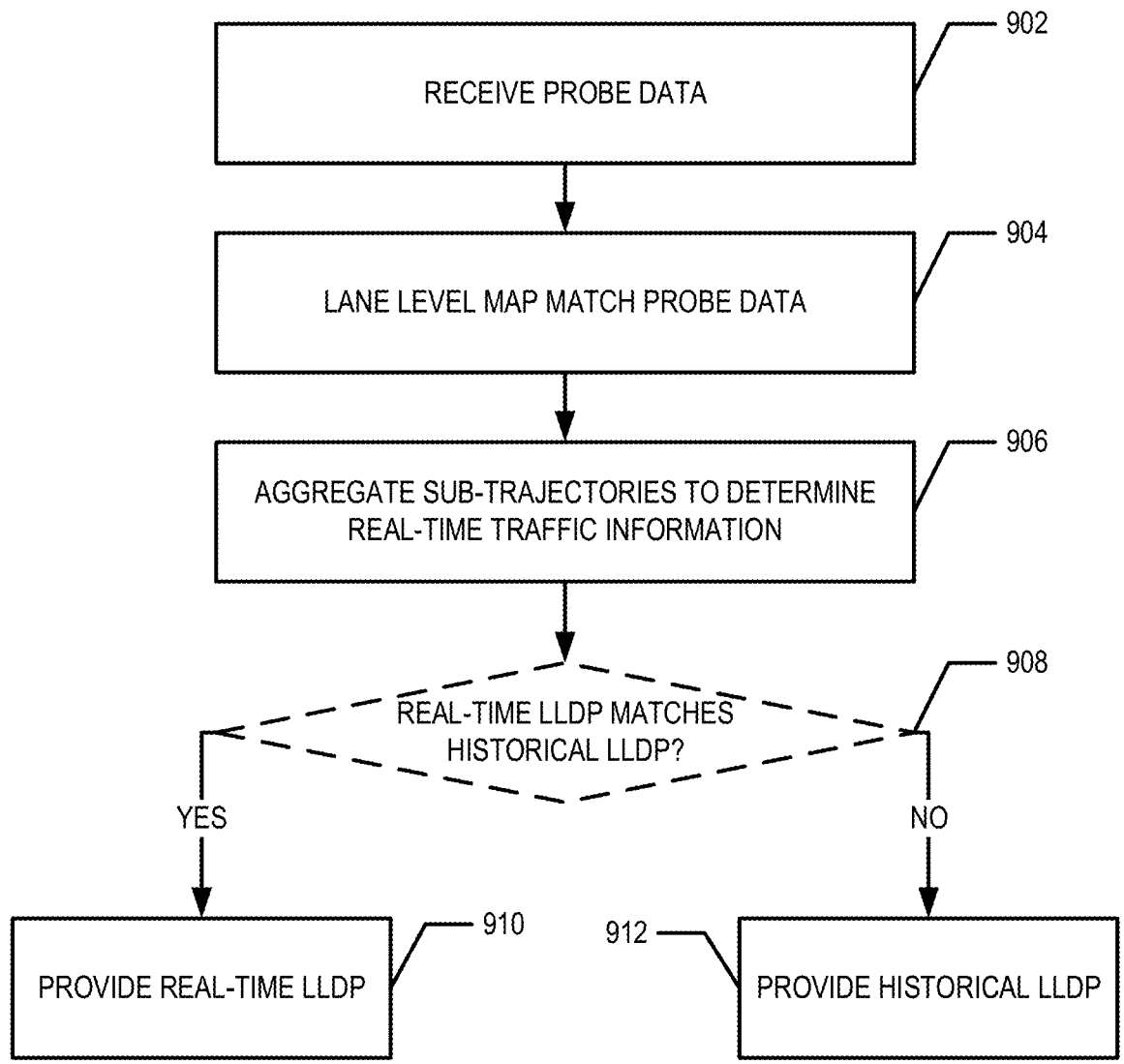
Figure 10:
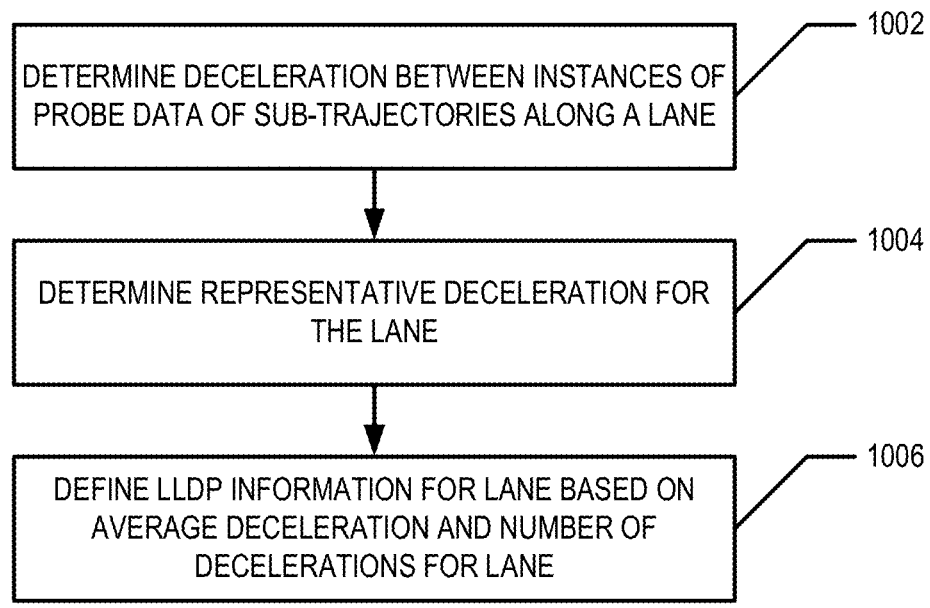
Figure 11A:
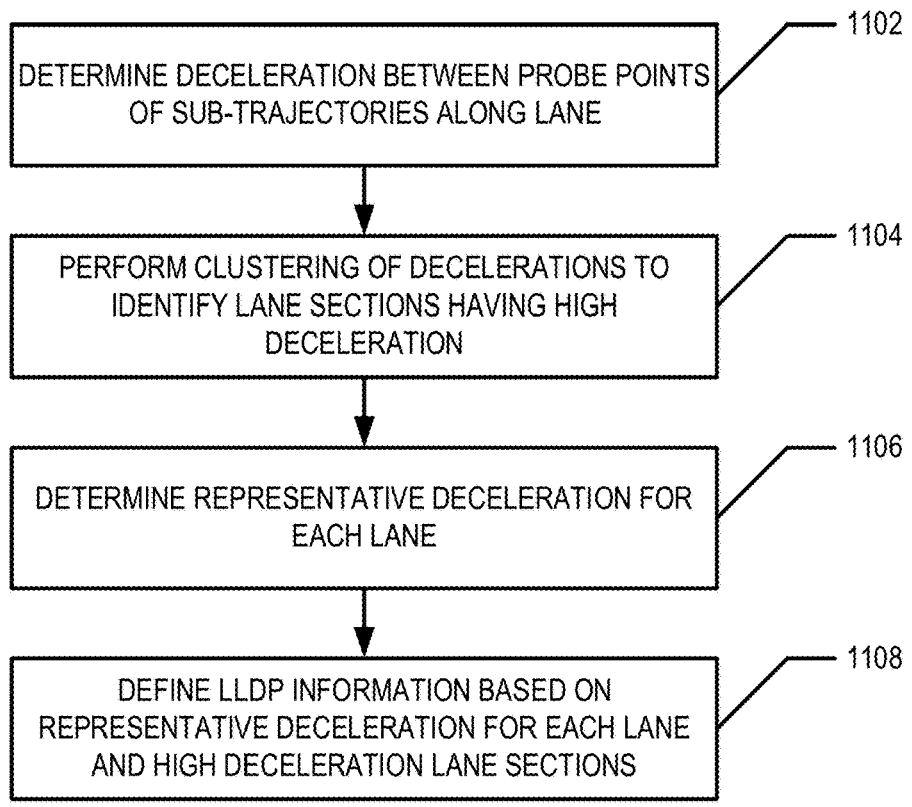
Figure 11B:
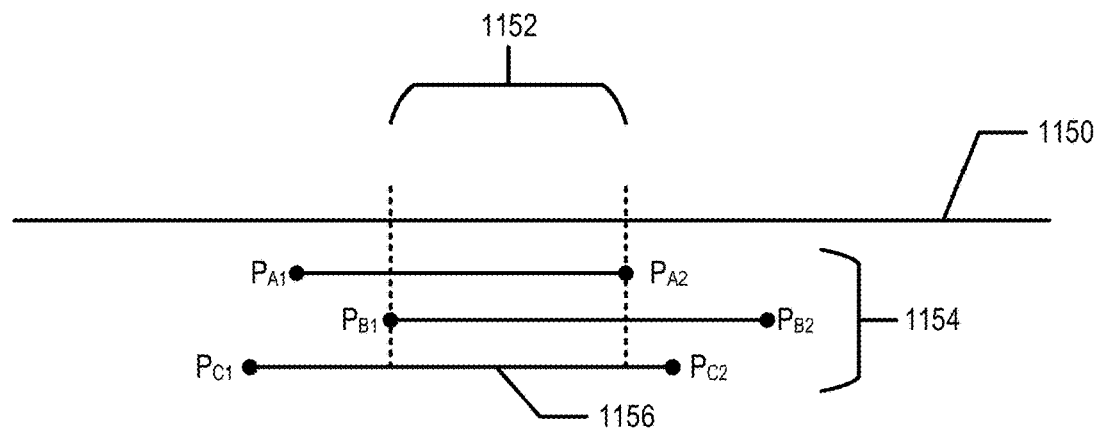
Figure 12:
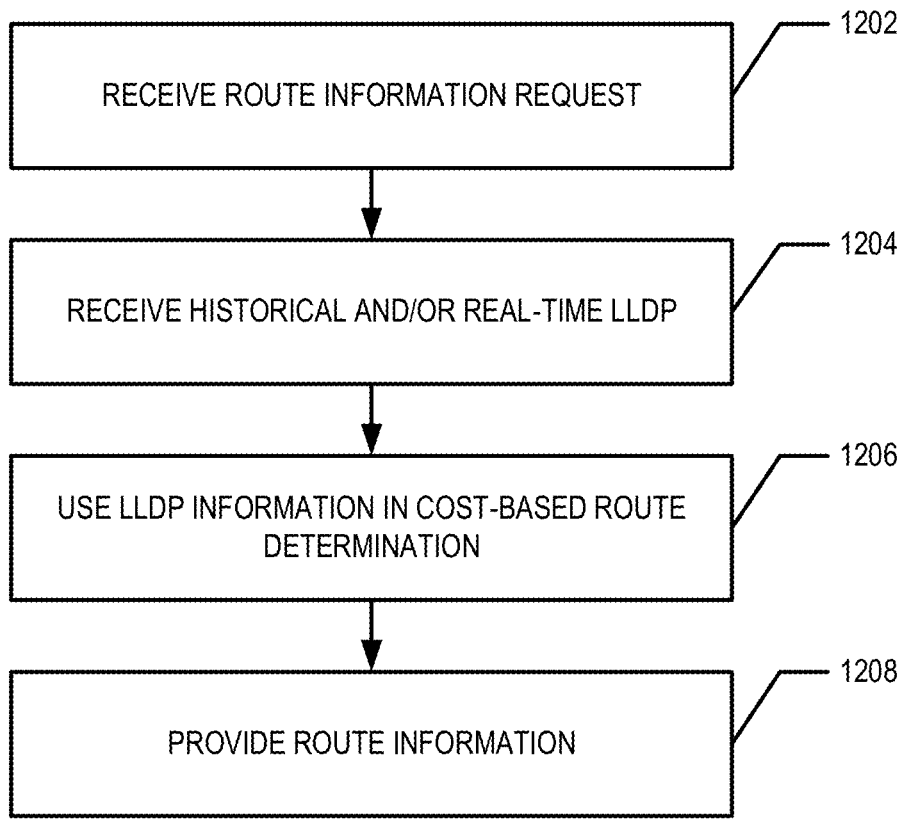
Figure 13:
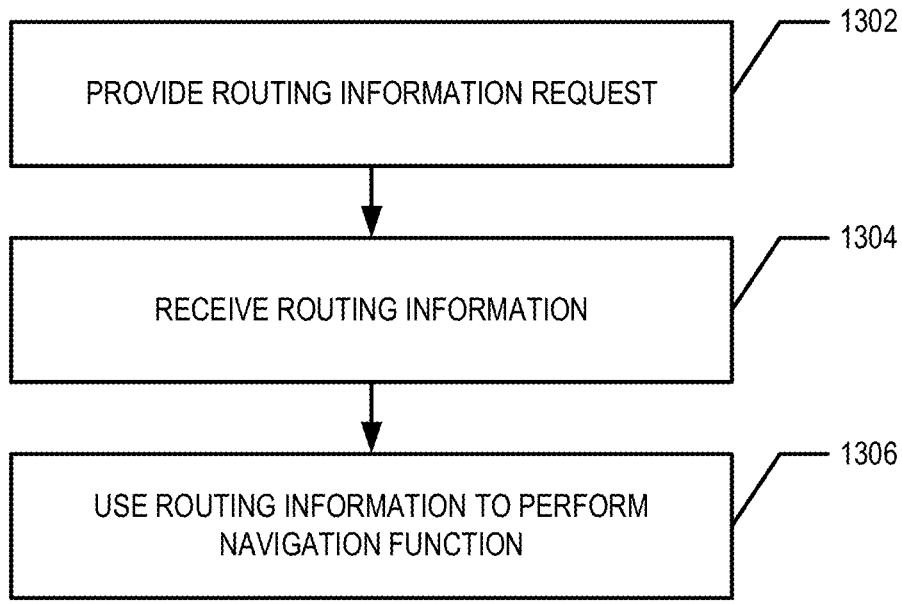

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a probe apparatus that may be specifically configured in accordance with an example embodiment;

FIG. 2C is a block diagram of a mobile apparatus that may be specifically configured in accordance with an example embodiment;

FIG. 3 is a block diagram illustrating a data flow, in accordance with an example embodiment;

FIG. 4A is a schematic diagram illustrating an example portion of a traversable network and FIG. 4B illustrates a corresponding lane level network graph, in accordance with an example embodiment;

FIG. 5A is a schematic diagram illustrating an example portion of a traversable network and FIG. 5B illustrates a corresponding lane level network graph, in accordance with an example embodiment;

FIG. 6A is a schematic diagram illustrating an example portion of a traversable network and FIG. 6B illustrates a corresponding lane level network graph, in accordance with an example embodiment;

FIG. 7 is a flowchart illustrating operations performed, such as by the probe apparatus of FIG. 2B, to provide probe information/data, in accordance with an example embodiment;

FIG. 8 is a flowchart illustrating operations performed, such as by the network apparatus of FIG. 2A, to determine and store historical LLDP information/data, in accordance with an example embodiment;

FIG. 9 is a flowchart illustrating operations performed, such as by the network apparatus of FIG. 2A, to determine real-time (or near real-time) LLDP information/data and provide LLDP information/data, in accordance with an example embodiment;

FIG. 10 is a flowchart illustrating operations performed, such as by the network apparatus of FIG. 2A, to determine sudden braking LLDP information/data, in accordance with an example embodiment;

FIG. 11A is a flowchart illustrating operations performed, such as by the network apparatus of FIG. 2A, to determine sudden braking LLDP information/data, in accordance with another example embodiment;

FIG. 11B provides a diagram illustrating operations performed, such as by the network apparatus of FIG. 2A, to identify sudden braking areas, in accordance with an example embodiment;

FIG. 12 is a flowchart illustrating operations performed, such as by the network apparatus of FIG. 2A, to provide route information/data, in accordance with an example embodiment; and FIG. 13 is a flowchart illustrating operations performed, such as by the mobile apparatus of FIG. 2C, to provide a route information/data request and use route information/data to perform one or more navigation functions, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

Methods, apparatus and computer program products are provided in accordance with an example embodiment to perform lane level routing and navigation using lane level dynamic profiles (LLDP) to describe current and/or expected traffic conditions, safety considerations, changes to the traversable network, and/or the like at the lane level. Various embodiments are directed to performing lane level routing and navigation. In various embodiments, an LLDP is used to perform the lane level routing; navigation; provision of warnings, alerts, and/or notifications; and/or the like. In an example embodiment, an LLDP comprises LLDP information/data that describes one or more dynamic parameters for each of one or more lanes of a traversable network and/or portion thereof. For example, the one or more dynamic parameters may include a representative speed, a sudden braking index, a sudden action index (and/or action index), an incident rate/frequency, a traffic volume, information/data regarding a lane closure, and/or the like. Various embodiments use historical LLDP information/data that describes historical dynamic parameters during a particular epoch as determined based on historical probe information/data. In an example embodiment, an epoch is a predetermined portion of a day, a week, a year, and/or the like. In an example embodiment, an example epoch may be from 2:00:00 am to 2:14:59 am. In another example embodiment, an example epoch is 2:00:00 am to 2:04:59 am on Monday. In still another example embodiment, an example epoch is 2:00:00 am to 2:19:59 am on 22 August. As used herein, historical probe information/data is probe information/data that was captured during a previous epoch and not in real-time (or near real-time) with respect to the current time/epoch. For example, historical probe information/data may have been captured half an hour ago, yesterday, last week, last month, last year, three years ago, and/or the like. Various embodiments use real-time LLDP information/data that describes real-time (or near real-time) dynamic parameters as determined based on current probe information/data. As used herein, current probe information/data is probe information/data that was captured during the current epoch and/or within a sliding time window that is the length of an epoch or shorter. For example, in an example embodiment where an epoch is fifteen minutes long, a sliding time window of five minutes may be used for aggregating current probe information/data to determine real-time (or near real-time) LLDP information/data. Various embodiments may use a combination of historical and real-time LLDP information/data for performing lane level routing and navigation.

As noted above, LLDP information/data may be determined based on probe information/data. For example, a network apparatus may receive probe information/data generated by one or more probe apparatuses as the probe apparatuses traverse at least a portion of the traversable network. In various embodiments, the traversable network is a network of road segments, paths, and/or the like that each comprise one or more lanes that are traversable by vehicles, pedestrians, bicycles, and/or the like. In an example embodiment, a probe apparatus is onboard and/or physically coupled to a vehicle. In an example embodiment, an instance of probe information/data comprises location information/data indicating a location of the probe apparatus when the instance of probe information/data was generated and/or captured, a timestamp indicating the time at which the instance of probe information/data was generated and/or captured, a trajectory identifier configured to enable the linking of instances of probe information/data into vehicle trajectories while still, in some embodiments, maintaining the anonymity of the probe apparatus and/or a vehicle the probe apparatus is onboard. In various embodiments, an instance of probe information/data may include various other information/data corresponding to sensor information/ data generated and/or captured by one or more sensors of the probe apparatus, in communication with the probe apparatus, onboard the vehicle, and/or the like and/or analysis of the sensor information/data.

In various embodiments, a network apparatus receives a plurality of instances of probe information/data corresponding to a plurality of probe apparatus trajectories through at least portions of the traversable network. In various embodiments, the network apparatus performs lane level map matching for one or more instances of probe information/data. In an example embodiment, an epoch corresponding to the probe information/data may be identified. The instances of probe information/data corresponding to a particular lane of the traversable network may be used to generate sub-trajectories corresponding to portions of probe apparatus trajectories that are along the particular lane. The sub-trajectories may be generated by time-ordering instances of probe information/data having the same trajectory identifier that were map-matched to the particular lane. The sub-trajectories may then be analyzed to determine dynamic parameters corresponding to the particular lane and/or epoch. In an example embodiment, the sub-trajectories and/or aspects thereof may be aggregated to determine dynamic parameters corresponding to the particular lane and/or epoch. For example, a representative speed corresponding to the particular lane and/or epoch may be determined. In an example embodiment, a sudden braking index corresponding to the particular lane and/or epoch may be determined. In an example embodiment, a sudden action index (and/or action index) corresponding to the particular lane and/or epoch may be determined. In an example embodiment, a lane closure corresponding to the particular lane may be identified and the corresponding lane level network graph may be updated. In various embodiments, the lane level network graph may be updated to include and/or be updated based on the LLDP information/data.

In various embodiments, the network apparatus may receive a routing information/data request. For example, a mobile apparatus may generate and provide a routing information/data request to request navigation and/or route information/data such as a route (e.g., from an origin to a destination), traffic information/data, lane level information/data for one or more upcoming maneuvers, and/or the like. The network apparatus may use the LLDP information/data and/or a portion thereof to determine a cost associated with one or more lanes. The cost associated with the one or more lanes may then be used in a cost-based routing and/or path finding algorithm. For example, an A* algorithm may be used to determine a route (e.g., from an origin to a destination) and/or the like based on costs associated with lanes of a traversable network, wherein the costs are determined from, generated based on, and/or are included in/extracted from the LLDP information/data corresponding to the lanes. In various embodiments, the LLDP information/data used in determining the route and/or the like is historical LLDP information/data and/or real-time (and/or near real-time) LLDP information/data.

The network apparatus may then generate and provide a response to the routing information/data request. For example, the network apparatus may generate a response to the routing information/data request that provides the route (e.g., form the origin to the destination), traffic information/data, lane level information/data for one or more upcoming maneuvers, and/or the like requested in the routing information/data request. The network apparatus may then provide a response to the routing information/data request such that the mobile apparatus receives the response and may use information/data included therein to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data and/or warnings, vehicle trajectory determination and/or guidance, vehicle speed and/or handling control, route and/or maneuver visualization, provision of safety alerts, and/or the like.

Example embodiments of the present invention provide technical improvements to the navigation arts by providing dynamic lane level information/data. As noted above, traditionally routing and navigation functions are performed at the segment level. However, various parameters corresponding to a first lane of a road segment may be significantly different from corresponding parameters of a second lane of the same road segment. For example, a left turn lane of a road segment may have quite different parameters, at least part of the time, compared to a forward continuing lane. These parameters may be dynamic based on traffic patterns, traffic incidents, and/or the like. Example embodiments enable these dynamic parameters to be taken into account in various lane level routing and navigation functions by using the dynamic parameters as a cost metric and/or to inform a cost metric used to assign a cost to a lane of a traversable network for use in cost-based routing and/or a path finding algorithm. Thus, various embodiments provide technical solutions for improved routing and navigation.

FIG. 1 provides an illustration of an example system that can be used in conjunction with various embodiments of the present invention. As shown in FIG. 1, the system may include one or more network apparatuses 10, a plurality of probe apparatuses 20 that may be disposed on a vehicle 5, one or more mobile apparatuses 30, one or more networks 50, and/or the like.

In various embodiments, the probe apparatus 20 may be an in vehicle navigation system, vehicle control system, a mobile computing device, and/or the like. For example, a probe apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the probe apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, a probe apparatus 20 configured to autonomously drive a vehicle 5 may perform multiple functions that are similar to those performed by a probe apparatus configured to be an ADAS (e.g., lane keeping, lane change assistance, maintaining a lane, merging, etc.). In some embodiments, a probe apparatus 20 may be onboard a personal vehicle, commercial vehicle, public transportation vehicle, fleet vehicle, and/or other vehicle. In various embodiments, the probe apparatus 20 may be a smartphone, tablet, personal digital assistant (PDA), personal computer, desktop computer, laptop, and/or other mobile computing device.

In various embodiments, the mobile apparatus 30 may be an in vehicle navigation system, vehicle control system, a mobile computing device, and/or the like. For example, a mobile apparatus 30 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the mobile apparatus 30 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, a mobile apparatus 30 configured to autonomously drive a vehicle 5 may perform multiple functions that are similar to those performed by a mobile apparatus 30 configured to be an ADAS (e.g., lane keeping, lane change assistance, maintaining a lane, merging, etc.). In some embodiments, a mobile apparatus 30 may be onboard a personal vehicle, commercial vehicle, public transportation vehicle, fleet vehicle, and/or other vehicle. In various embodiments, the mobile apparatus 30 may be a smartphone, tablet, personal digital assistant (PDA), personal computer, desktop computer, laptop, and/or other mobile computing device. In various embodiments, a mobile apparatus 30 may be a probe apparatus 20.

In an example embodiment, the network apparatus 10 may be a server, group of servers, distributed computing system, and/or other computing system. For example, the network apparatus 10 may be in communication with a plurality of probe apparatuses 20, one or more mobile apparatuses 30, and/or the like via one or more wired or wireless networks 50. While the network apparatus 10 is generally described herein as a single computing entity, in various embodiments, the functions described herein as being performed by the network apparatus 10 may be performed by one or more of multiple network apparatuses 10.

In an example embodiment, a network apparatus 10 may comprise components similar to those shown in the example network apparatus 10 diagrammed in FIG. 2A. In an example embodiment, the network apparatus 10 is configured to receive and analyze a plurality of instances of probe information/data, generate and store historical LLDPs, generate real-time (or near real-time) LLDPs, perform lane level routing and/or navigation functions using one or more historical and/or real-time (or near real-time) LLDPs, receive routing information/data requests and generate and provide responses thereto, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, a probe apparatus 20 is onboard a vehicle 5. In an example embodiment, the probe apparatus 20 may be configured to provide navigation and/or route information/data to a user (e.g., an operator of the vehicle 5). In an example embodiment, the probe apparatus 20 may be configured to autonomously drive a vehicle 5 and/or assist in control of a vehicle 5 (e.g., an ADAS) in accordance with navigation and/or route information/data. In an example embodiment, the probe apparatus 20 may be configured to gather, collect, capture, and/or the like instances of probe information/data as the vehicle 5 moves through the traversable network and/or a portion thereof. For example, an instance of probe information/data may comprise a time stamp indicating the time that the instance of probe information/data was gathered, collected, captured and/or the like. In an example, an instance of probe information/data may comprise a position and/or heading corresponding to a location and/or heading of the vehicle 5 and/or probe apparatus 20 at the time the instance of probe information/data was gathered, collected, captured, and/or the like. In an example embodiment, an instance of probe information/data may comprise information/data identifying one or more localization objects observed when the probe apparatus 20 and/or vehicle 5 was located at the position and/or heading of the instance of probe information/data, a distance between the probe apparatus 20 and/or vehicle 5 and at least one of the one or more localization objects when the probe apparatus 20 and/or vehicle 5 was located at the position and/or heading of the instance of probe information/data, and/or the like. In an example embodiment, an instance of probe information/data comprises a trajectory identifier configured to enable the linking of instances of probe information/data into vehicle trajectories while still, in some embodiments, maintaining the anonymity of the probe apparatus and/or a vehicle the probe apparatus is onboard.

In an example embodiment, as shown in FIG. 2B, the probe apparatus 20 may comprise a processor 22, memory 24, a communications interface 26, a user interface 28, one or more sensors 29 (e.g., a location sensor such as a global navigation satellite system (GNSS) sensor; inertial measurement unit (IMU) sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, a mobile apparatus 30 is onboard a vehicle 5. In an example embodiment, the mobile apparatus 30 may be configured to provide navigation and/or route information/data to a user (e.g., an operator of the vehicle 5). In an example embodiment, the mobile apparatus 30 may be configured to autonomously drive a vehicle 5 and/or assist in control of a vehicle 5 (e.g., an ADAS) in accordance with navigation and/or route information/data. In an example embodiment, the mobile apparatus 30 may be configured to generate and provide routing information/data requests, receive responses to routing information/data requests, perform one or more navigation functions based on and/or using navigation and/or route information/data provided in response to routing information/data requests, and/or or the like.

In an example embodiment, as shown in FIG. 2C, the mobile apparatus 30 may comprise a processor 32, memory 34, a communications interface 36, a user interface 38, one or more sensors 39 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the mobile apparatus 30 to determine one or more features of the corresponding vehicle's 5 surroundings and/or monitor the vehicle's 5 operating parameters), and/or other components configured to perform various operations, procedures, functions or the like described herein. In at least some example embodiments, the memory 34 is non-transitory.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20 may be in communication with a network apparatus 10 via the network 50. For example, a probe apparatus 20 may communicate with the network apparatus 10 via a network, such as the Cloud. For example, the Cloud may be a computer network that provides shared computer processing resources and data to computers and other devices connected thereto. In various embodiments, a mobile apparatus 30 may communicate with the network apparatus 10 via a network, such as the Cloud.

Certain example embodiments of the network apparatus 10, probe apparatus 20, and the mobile apparatus 30 are described in more detail below with respect to FIGS. 2A, 2B, and 2C.

II. Example Operation

Methods, apparatus and computer program products are provided in accordance with an example embodiment in perform lane level routing and navigation using lane level dynamic profiles (LLDP) to describe current and/or expected traffic conditions, safety considerations, changes to the traversable network, and/or the like at the lane level. Various embodiments are directed to performing lane level routing and navigation. In various embodiments, an LLDP is used to perform the lane level routing; navigation; provision of warnings, alerts, and/or notifications; and/or the like. In an example embodiment, an LLDP comprises LLDP information/data that describes one or more dynamic parameters for each of one or more lanes of a traversable network and/or portion thereof. For example, the one or more dynamic parameters may include a representative speed, a sudden braking index, a sudden action index (and/or action index), an incident rate/frequency, a traffic volume, information/data regarding a lane closure, and/or the like. Various embodiments use historical LLDP information/data that describes historical dynamic parameters during a particular epoch as determined based on historical probe information/data. In an example embodiment, an epoch is a predetermined portion of a day, a week, a year, and/or the like. In an example embodiment, an example epoch may be from 2:00:00 am to 2:14:59 am. In another example embodiment, an example epoch is 2:00:00 am to 2:04:59 am on Monday. In still another example embodiment, an example epoch is 2:00:00 am to 2:19:59 am on 22 August. As used herein, historical probe information/data is probe information/data that was captured during a previous epoch and not in real-time (or near real-time) with respect to the current time/epoch. For example, historical probe information/data may have been captured half an hour ago, yesterday, last week, last month, last year, three years ago, and/or the like. Various embodiments use real-time LLDP information/data that describes real-time (or near real-time) dynamic parameters as determined based on current probe information/data. As used herein, current probe information/data is probe information/data that was captured during the current epoch and/or within a sliding time window that is the length of an epoch or shorter. For example, in an example embodiment where an epoch is fifteen minutes long, a sliding time window of five minutes may be used for aggregating current probe information/data to determine real-time (or near real-time) LLDP information/data. Various embodiments may use a combination of historical and real-time LLDP information/data for performing lane level routing and navigation.

FIG. 3 is a block diagram illustrating a data flow, in accordance with an example embodiment. For example, a network apparatus 30 may store a historical probe data store 302 (e.g., a historical probe database). In various embodiments, the historical probe data store 302 stores instances of historical probe information/data received from one or more probe apparatuses 20. In various embodiments, a lane level map matching module 304, engine, sub-process, and/or the like may be used to map match the historical probe information/data to lanes of the traversable network. For example, the lane level map matching module 304, engine, sub-process, and/or the like may access historical probe information/data from the historical probe data store 302, perform a lane level map matching function on each accessed instance of historical probe information/data, and provide the map-matched historical probe information/data to an LLDP aggregator module 306, engine, sub-process, and/or the like. In an example embodiment, an instance of map-matched historical probe information/data, the lane level map matching module 304, engine, sub-process, and/or the like may provide information/data including a lane identifier configured to identify the lane the corresponding instance of probe information/data was map-matched to, travel speed corresponding to the instance of probe information/data, a location along the lane (e.g., latitude and longitude, an offset from one end of the lane, and/or the like), a time corresponding to the instance of probe information/data (e.g., the timestamp from the instance of probe information/data), the trajectory identifier from the instance of probe information/data, and/or the like.

For example, the LLDP aggregator module 306, engine, sub-process, and/or the like may receive the map-matched historical probe information/data and use the map-matched historical probe information/data to generate historical LLDP information/data. For example, the LLDP aggregator module 306, engine, sub-process, and/or the like may determine and/or generate historical LLDPs by aggregating and/or analyzing the map-matched historical probe information/data. The network apparatus 10 may store a historical LLDP data store 308 (e.g., a historical LLDP database). For example, the network apparatus 10 may store the historical LLDPs comprising historical LLDP information/data determined and/or generated by the LLDP aggregator module 306, engine, sub-process, and/or the like in a historical LLDP data store 308. In an example embodiment, an LLDP comprises LLDP information/data. In various embodiments, the LLDP information/data comprises a lane identifier configured to identify the corresponding lane, an epoch identifier configured to identify the corresponding epoch, values for one or more dynamic parameters (e.g., representative speed, sudden braking index, sudden action index (and/or action index), incident rate/frequency, traffic volume, and/or the like), and/or the like. In an example embodiment, a lane identifier is an identifier that uniquely identifies a lane of the traversable network. In an example embodiment, a lane identifier comprises an identifier that identifies a road segment of the traversable network and a corresponding lane index configured to identify a particular lane of the road segment, and/or the like.

An application program interface (API) 310 may act as an interface between the historical LLDP data store 308 and a lane level routing and navigation module 326, engine, sub-process, and/or the like. In various embodiments, the API 10 is configured to receive a request comprising a lane identifier, a time used for identifying a corresponding epoch, and/or the like. The API 310 may access one or more LLDPs from the historical LLDP data store 308 based on the lane identifier and the epoch corresponding to the time provided in the request.

The lane level routing and navigation module 326, engine, sub-process, and/or the like is configured to use one or more LLDP (e.g., historical LLDPs, real-time (or near real-time) LLDPs) to perform lane level routing and navigation functions in response to a received routing information/data request. In various embodiments, the lane level routing and navigation module 326 may be configured to access a lane level network graph from the lane level network graph data store 328 (e.g., lane level network graph database). The lane level network graph data store 328 may store lane level network graphs that describe lanes and the connectivity between lanes of at least a portion of the traversable network. FIGS. 4B, 5B, and 6B provide example lane level network graphs. As shown in FIG. 3, the lane level routing and navigation module 326 is further configured to receive real-time (or near real-time) LLDPs from the real-time traffic module 322, engine, sub-process, and/or the like. For example, the real-time traffic module 322, engine, sub-process, and/or the like may be configured to receive real-time (or near real-time) probe information/data and to aggregate and/or analyze the real-time (or near real-time) probe information/data to generate and/or determine real-time (or near real-time) traffic information/data. In various embodiments, the real-time (or near real-time) traffic information/data may include real-time LLDPs and/or real-time LLDP information/data. In various embodiments, the real-time traffic module 322 is configured to aggregate and/or analyze the real-time (or near real-time) instances of probe information/data within a sliding time window that is the length of an epoch or shorter. The real-time traffic module 322, engine, sub-process, and/or the like may be configured to provide the real-time (or near real-time) traffic information/data and/or real-time LLDPs and/or real-time LLDP information/data to the lane level routing and navigation module 326, engine sub-process, and/or the like. In various embodiments, the real-time (or near real-time) traffic information/data and/or real-time LLDP and/or real-time LLDP information/data comprises a lane identifier configured to identify the corresponding lane, a time corresponding to the time that the corresponding real-time (or near real-time) probe information/data was captured and/or when the analysis and/or aggregation was performed to generate the real-time traffic information/data and/or real-time LLDP and/or corresponding LLDP information/data, real-time (or near-real time) values for one or more dynamic parameters (e.g., representative speed, sudden braking index, sudden action index (and/or action index), incident rate/frequency, traffic volume, and/or the like), and/or the like.

In various embodiments, a mobile apparatus 30 may generate a routing information/data request and provide the request via the network 50. The network apparatus 10 may receive the routing information/data request. In an example embodiment, the routing information/data request comprises an origin location (e.g., a point of interest (POI) identifier, a street address, latitude and longitude, and/or the like), a destination location (e.g., a point of interest (POI) identifier, a street address, latitude and longitude, and/or the like), and/or the like. In an example embodiment, the routing information/data request may include an indication of what type of routing and navigation information/data is being requested, the current location of the mobile apparatus 30, and/or the like. In various embodiments, a localization module 324, engine, sub-process, and/or the like may receive at least a portion of the routing information/data request and perform one or more localization functions. For example, the localization module 324, engine, sub-process, and/or the like may match the origin location, destination location, current location of the mobile apparatus 30, and/or the like to lanes of the traversable network. The localization module 324, engine, sub-process, and/or the like may provide the localized request information/data to the lane level routing and navigation module 326, engine sub-process, and/or the like. In an example embodiment, the localized request information/data comprises a lane identifier for one or more of the origin location, destination location, and current location of the mobile apparatus 30, speed of the mobile apparatus 30, a timestamp corresponding to the time the request was generated, provided by the mobile apparatus 30, and/or received by the network apparatus 10, and/or the like. The lane level routing and navigation module 326 may then perform lane level routing and navigation functions based on the historical LLDPs accessed from the historical LLDP data store 308 via the API 310; real-time traffic information/data and/or real-time LLDPs generated by the real-time traffic module 322, engine, sub-process, and/or the like; and the localized request information/data provided by the localization module 324, engine, sub-process, and/or the like. The lane level routing and navigation module 326, engine, sub-process, and/or the like may then generate a response to the routing information/data request based on the performed lane level routing and navigation functions. The response may then be provided by the network apparatus 10 (e.g., via network 50) such that the mobile apparatus 30 receives the response. The mobile apparatus 30 may then use the response and/or a portion thereof to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data and/or warnings, vehicle trajectory determination and/or guidance, vehicle speed and/or handling control, route and/or maneuver visualization, provision of safety alerts, and/or the like.

In order to perform the lane level routing and/or navigation functions, the lane level routing and navigation module 326, engine, sub-process, and/or the like uses lane level network graphs access from the lane level network graph data store 328. Generally, a traversable network may be represented as a graph of traversable elements (e.g., road segments, lanes of road segments, and/or the like) and nodes (e.g., intersections) with the traversable elements being represented as directed links between the nodes. FIG. 4A illustrates an example graph representing a portion of a traversable network 400. The portion of the traversable network 400 comprises links L1, L2, L3, L4, L6, L7, L8, and L9, where link L1 comprises three lanes. FIG. 4B illustrates an example lane level network graph 410 corresponding to the portion of the traversable network 400. In the lane level network graph 410, the nodes represent the traversable elements (e.g., links L2, L3, L4, L6, L7, L8, L9, and lanes 1, 2, and 3 of link L1) and the links represent the connectivity of the traversable elements and describe the connections (e.g., traversability) between the nodes (links/lanes).

FIG. 5A illustrates an example portion of a traversable network 500 that is similar to the portion of the traversable network 400, but where lane 1 of link L1 is experiencing real-time (or near real-time) traffic conditions where the real-time (or near real-time) dynamic parameter of the lane (e.g., representative speed, sudden braking index, sudden action index (and/or action index), traffic volume, and/or the like) is (significantly) different from the historical dynamic parameter of the lane for the corresponding epoch (as described by the corresponding LLDP) and where lane 3 of link L1 is associated with a warning based on the historical LLDP for the corresponding epoch. FIG. 5B illustrates an example lane level network graph 510 corresponding to the portion of the traversable network 500, illustrating how the traffic condition information/data and/or warnings corresponding to the portion of the traversable network 500 are translated to and/or used to modify the connectivity information/data of the lane level network graph 510 (e.g., with respect to lane level network graph 410). For example, lane level network graph 510 is modified (e.g., with respect to lane level network graph 410) based on the traffic conditions and/or warnings associated with the portion of the traversable network 500.

FIG. 6A illustrates an example portion of a traversable network 600 that is similar to the portion of the traversable network 400, but where lane 1 of link L1 is closed due to construction, an incident, and/or the like. FIG. 6B illustrates a lane level network graph 610 corresponding to the portion of the traversable network 600, illustrating how the traffic condition information/data (e.g., lane closure) corresponding to the portion of the traversable network 600 is translated to and/or used to modify the connectivity information/data of the lane level network graph 610 (e.g., with respect to lane level network graph 410).

Exemplary Operation of a Probe Apparatus

In various embodiments, a probe apparatus 20 is onboard a vehicle 5 that is traversing at least a portion of a traversable network. In various embodiments, one or more sensors 29 are onboard the vehicle 5 and are in communication with the probe apparatus 20. In an example embodiment, the traversable network is represented by a digital map (e.g., possibly in the form of a geographic database). In various embodiments, the probe apparatus 20 captures instances of probe information/data via the one or more sensors 29 as the vehicle 5 traverses the at least a portion of the traversable network. In an example embodiment, the probe apparatus 20 may capture instances of probe information/data periodically based on time (e.g., every second, every ten seconds, every thirty seconds, every minute, and/or the like) and/or distance traveled (e.g., every meter, ten meters, fifty meters, hundred meters, 250 meters, and/or the like). The probe apparatus 20 may be configured to provide one or more instances of probe information/data via a network 50 such that a network apparatus 10 receives the one or more instances of probe information/data.

FIG. 7 provides a flowchart illustrating operations performed, such as by the probe apparatus 20 of FIG. 2B to provide one or more instances of probe information/data. Starting at block 702, an instance of probe information/data is captured. For example, as the vehicle 5 traverses at least a portion of the traversable network, one or more sensors 29 may capture sensor information/data and communicate the sensor information/data to the probe apparatus 20. For example, the probe apparatus 20 may capture sensor information/data. For example, the probe apparatus 20 may comprise means, such as the processor 22, memory 24, sensors 29, and/or the like, for capturing sensor information/data. In various embodiments, the sensor information/data describes at least a portion of the environment surrounding the vehicle 5. For example, the sensor information/data may comprise GNSS information/data, digital images, lidar point clouds, radar point clouds, ultrasonic information/data, electromagnetic information/data, thermal information/data, and/or the like. In various embodiments, the probe apparatus 20 may concurrently determine location information/data indicating a location and/or heading or pose of the vehicle 5 and/or the probe apparatus 20 when the sensor information/data was captured and a timestamp corresponding to the date and/or time at which the sensor information/data was captured. For example, the vehicle apparatus 20 may determine location information/data for the vehicle 5 and/or the probe apparatus 20 based on GNSS information/data, IMU sensor information/data, visual odometry (e.g., based on one or more digital images), and/or other localization techniques and/or a combination thereof. In various embodiments, the probe apparatus 20 comprises and/or is communication with an apparatus comprising a clock such that the probe apparatus 20 may determine a timestamp corresponding to the date and/or time at which the sensor information/data is captured. In various embodiments, the instance of probe information/data comprises the location information/data. In various embodiments, the instance of probe information/data comprises the timestamp, a trajectory identifier, a speed of the vehicle 5 at the date and/or time indicated by the timestamp, one or more other elements of the sensor information/data, and/or the like.

At block 704, the instance of probe information/data is provided. For example, the probe apparatus 20 may provide the instance of probe information/data such that a network apparatus 10 receives the instance of probe information/data. For example, the probe apparatus 20 may comprise means, such as processor 22, memory 24, communications interface 26, and/or the like, for providing an instance of probe information/data such that the network apparatus 10 receives the instance of probe information/data. For example, the probe apparatus may repeatedly, such as regularly and/or periodically (e.g., based on a time and/or travel distance trigger), provide one or more instances of probe information/data.

Exemplary Operation of a Network Apparatus

In various embodiments, a network apparatus 10 may be configured to receive instances of probe information/data; analyze and/or aggregate the instances of probe information/data to determine and/or generate real-time (or near real-time) traffic condition information/data, real-time (or near real-time) LLDPs, and/or historical LLDPs; use the LLDPs (historical and/or near real-time) to perform route and/or navigation functions; receive route information/data requests and provide responses thereto; and/or the like.

FIG. 8 is a flowchart illustrating operations performed, such as by the network apparatus of FIG. 2A, to determine and store an LLDP (e.g., a historical LLDP), in accordance with an example embodiment. Starting at block 802, a plurality of instances of probe information/data are received. For example, the network apparatus 10 may receive a plurality of instances of probe information/data provided by one or more probe apparatuses 20. For example, a network apparatus 10 may comprise means, such as processor 12, memory 14, communications interface 16, and/or the like, for receiving a plurality of instances of probe information/ data. In various embodiments, an instance of probe information/data comprises location information/data indicating a location of the vehicle 5 when the instance of probe information/data was captured. In various embodiments, an instance of probe information/data may further comprise a timestamp indicating a date and/or time that the instance of probe information/data was captured, a heading of the vehicle 5 when the instance of probe information/data was captured, a travel speed of the vehicle at the time when the instance of probe information/data was captured, information/data corresponding to the environment about the vehicle 5 (e.g., sensor information/data) when the instance of probe information/data was captured, a trajectory identifier, and/or the like. In various embodiments, the received instances of probe information/data may be stored in the historical probe data store 302.

At block 804, each of the plurality of instances of probe information/data is lane level map-matched based on the location information/data of the instance of probe information/data. For example, the network apparatus 10 may map match each of the plurality of instances of probe information/data to a lane of a lane level network graph (e.g., which is part of a digital map, in an example embodiment) representing at least a portion of the traversable network based on the location information/data of the instance of probe information/data. For example, the network apparatus comprises means, such as processor 12, memory 14, and/or the like, for lane level map matching each of the plurality of instances of probe information/data to corresponding lanes of a lane level network graph representing at least a portion of the traversable network based on the location information/data of the instance of probe information/data. For example, the lane level map matching module 304, engine, sub-process, and/or the like may lane level map match the instances of probe information/data. For example, a lane along which the vehicle 5 was traveling when the probe apparatus 20 captured the instance of probe information/data may be determined based on the location information/data of the instance of probe information/data.

In an example embodiment, each instance of probe information/data may be time-matched to an epoch, at block 806. An epoch is a predefined period or window of time that may be defined by a date of the year, day of the week, and/or time of day. In an example embodiment, an epoch is a fifteen minute period of time with a defined start and stop date and/or time. For example, in various embodiments, an epoch may be a time window of a day, week, or year of a predetermined time length. For example, an instance of probe information/data may be time-matched to an epoch based on a set of predefined epochs and the timestamp of the instance of probe information/data. For example, the network apparatus 10 may time match each instance of probe information/data based on a time stamp of the instance of probe information/data and a set of predefined epochs. For example, the network apparatus 10 may comprise means, such as processor 12, memory 14, and/or the like, for time matching each instance of probe information/data based on a time stamp of the instance of probe information/data and a set of predefined epochs. For example, the lane level map matching module 304, engine, sub-process, and/or the like may identify an epoch corresponding to each instance of probe information/data.

At block 808, the lane level map-matched and epoch matched instances of probe information/data are aggregated and/or analyzed to determine LLDP information/data and to generate and/or update an LLDP. For example, the network apparatus 10 (e.g., using the LLDP aggregator module 306, engine, sub-process, and/or the like) may aggregate and/or analyze the lane level map-matched and epoch matched instances of probe information/data to determine LLDP information/data and to generate and/or update an LLDP. For example, the network apparatus 10 may comprise means, such as processor 12, memory 14, and/or the like, for aggregating and/or analyzing the lane level map-matched and epoch matched instances of probe information/data to determine LLDP information/data and to generate and/or update an LLDP. For example, instances of probe information/data that have a common trajectory identifier may be time ordered, based on the corresponding time stamps, to generate probe apparatus 20 trajectories through at least a portion of the traversable network. The probe apparatus 20 trajectories may be segmented into sub-trajectories based on the lane of the traversable network that each of the instance of probe information/data were map-matched to. For example, instances of probe information/data of a trajectory that were map-matched to a first lane of the traversable network form a sub-trajectory corresponding to the first lane. Sub-trajectories corresponding to the same lane and the same epoch may then be aggregated and/or analyzed together to determine a value of one or more dynamic parameters corresponding to the lane. For example, a speed distribution, deceleration distribution, lane change distribution (e.g., representing lane level sinuosity), traffic volume, and/or the like of probe apparatuses along a first lane during a first epoch may be determined based on sub-trajectories corresponding to the first lane and the first epoch. For example, the dynamic parameter may be a representative speed (e.g., an average speed such as a mean, median, or mode of the speed distribution) determined based on the sub-trajectories corresponding to the first lane and the first epoch, a sudden braking index determined based on the deceleration distribution of sub-trajectories corresponding to the first lane and the first epoch, a sudden action index (and/or action index) determined based on the deceleration distribution and the lane change distribution, a traffic volume, and/or the like. In various embodiments, the sudden action index is determined based on the frequency and intensity of decelerations exhibited by sub-trajectories corresponding to the first lane and the first epoch and the frequency of sudden lane changes into and/or out of the first lane exhibited by sub-trajectories corresponding to the first lane and the first epoch. In various embodiments, the action index is determined based on the frequency and intensity of decelerations exhibited by sub-trajectories corresponding to the first lane and the first epoch and the frequency of lane changes into and/or out of the first lane exhibited by sub-trajectories corresponding to the first lane and the first epoch.

In an example embodiment, a sudden lane change may be a lane change (e.g., changing from one lane to an adjacent and/or substantially parallel lane, for example) that occurs in under a threshold time. For example, a non-sudden lane change may be expected to be exhibited over the course of multiple instances of probe information/data (e.g., longer than a threshold time) of a sub-trajectory as the probe apparatus 20 and/or vehicle 5 moved closer to the lane boundary and then moved across the lane boundary. In contrast, a sudden lane change may occur quickly (e.g., shorter than a threshold time) such that the lane change maneuver is exhibited over a smaller number of instances of probe information/data of the sub-trajectory. In an example embodiment, an action index is used rather than a sudden action index. In an example embodiment, an action index is determined based on the frequency and intensity of decelerations exhibited by sub-trajectories corresponding to the first lane and the first epoch and the frequency of lane changes (sudden and non-sudden lane changes) into and/or out of the first lane exhibited by sub-trajectories corresponding to the first lane and the first epoch.

At block 810, the LLDP is stored. For example, the network apparatus 10 may store the LLDP in the historical LLDP data store 308 (e.g., in memory 14). For example, the network apparatus 10 may comprise means, such as processor 12, memory 14, and/or the like, for storing the generated and/or updated LLDP(s) in the historical LLDP data store 308. The stored historical LLDPs may then be accessed from the historical LLDP data store 308 (e.g., via API 310) for use in performing one or more lane level route or navigation functions using the historical LLDP information/data.

FIG. 9 provides a flowchart illustrating operations performed by a network apparatus 10, such as that shown in FIG. 2A, for determining real-time (or near real-time) traffic information/data, LLDPs, and/or LLDP information/data and providing LLDPs and/or LLDP information/data for use in performing one or more routing and/or navigation functions. Starting at block 902, a plurality of instances of current probe information/data are received. For example, the network apparatus 10 may receive a plurality of instances of current probe information/data provided by one or more probe apparatuses 20. For example, a network apparatus 10 may comprise means, such as processor 12, memory 14, communications interface 16, and/or the like, for receiving a plurality of instances of probe information/data. In various embodiments, an instance of current probe information/data comprises location information/data indicating a location of the vehicle 5 when the instance of probe information/data was captured. In various embodiments, an instance of current probe information/data may further comprise a timestamp indicating a date and/or time that the instance of current probe information/data was captured, a heading of the vehicle 5 when the instance of current probe information/data was captured, a travel speed of the vehicle at the time when the instance of current probe information/data was captured, information/data corresponding to the environment about the vehicle 5 (e.g., sensor information/data) when the instance of current probe information/data was captured, a trajectory identifier, and/or the like. In an example embodiment, the received instances of current probe information/data may be provided to the real-time traffic module 322, engine, sub-process, and/or the like.

At block 904, each of the plurality of instances of current probe information/data is lane level map-matched based on the location information/data of the instance of probe information/data. For example, the network apparatus 10 may map match each of the plurality of instances of current probe information/data to a lane of a lane level network graph (e.g., which is part of a digital map, in an example embodiment) representing at least a portion of the traversable network based on the location information/data of the instance of current probe information/data. For example, the network apparatus comprises means, such as processor 12, memory 14, and/or the like, for lane level map matching each of the plurality of instances of current probe information/data to corresponding lanes of a lane level network graph representing at least a portion of the traversable network based on the location information/data of the instance of current probe information/data. For example, a lane along which the vehicle 5 was traveling when the probe apparatus 20 captured the instance of current probe information/data may be determined based on the location information/data of the instance of current probe information/data.

At block 906, the map-matched instances of current probe information/data may be aggregated and/or analyzed to determine real-time (or near real-time) traffic information/data, LLDPs, LLDP information/data, and/or the like. For example, the network apparatus 10 (e.g., the real-time traffic module 322, engine, sub-process, and/or the like) may aggregate and/or analyze the map-matched instances of current probe information/data to determine real-time (or near real-time) traffic information/data, LLDPs, LLDP information/data, and/or the like. For example, the network apparatus 10 may comprise means, such as processor 12, memory 14, and/or the like, for aggregating and/or analyzing the map-matched instances of current probe information/data to determine real-time (or near real-time) traffic information/data, LLDPs, LLDP information/data, and/or the like. In various embodiments, the map-matched instances of current probe information/data are aggregated based on a sliding time window. In an example embodiment, the sliding time window is the length of an epoch or shorter. For example, in an example embodiment where an epoch is fifteen minutes long, a sliding time window of five minutes may be used for aggregating current probe information/data to determine real-time (or near real-time) LLDP information/data.

For example, instances of current probe information/data that have a common trajectory identifier may be time ordered, based on the corresponding time stamps, to generate probe apparatus 20 trajectories through at least a portion of the traversable network. The probe apparatus 20 trajectories may be segmented into sub-trajectories based on the lane of the traversable network that each of the instances of probe information/data were map-matched to. For example, instances of probe information/data of a trajectory that were map-matched to a first lane of the traversable network form a sub-trajectory corresponding to the first lane. Sub-trajectories corresponding to the same lane may then be aggregated and/or analyzed together to determine current and/or real-time (or near real-time) values of one or more dynamic parameters corresponding to the lane. For example, a speed distribution, deceleration distribution, traffic volume, lane change distribution, and/or the like of probe apparatuses along a first lane during the sliding time window may be determined based on sub-trajectories corresponding to the first lane. For example, the dynamic parameter may be a representative speed (e.g., an average speed such as a mean, median, or mode of the speed distribution) determined based on the sub-trajectories corresponding to the first lane, a sudden braking index determined based on the deceleration distribution of sub-trajectories corresponding to the first lane, a sudden action index (and/or action index) based on the deceleration distribution and lane change distribution of sub-trajectories corresponding to the first lane, a traffic volume, and/or the like.

In some embodiments, both real-time (or near real-time) LLDPs and historical LLDPs are provided to the lane level routing and navigation module 326, engine, sub-process, and/or the like and the lane level routing and navigation module 326, engine, sub-process, and/or the like may either use both LLDPs corresponding to a particular lane or may determine which of the LLDPs (e.g., the historical LLDP or the real-time (or near real-time) LLDP corresponding to the particular lane) to use. In an example embodiment, a real-time (or near real-time) LLDP or a historical LLDP is provided for one or more lanes of the traversable network and the real-time traffic module 322, engine, sub-process, and/or the like may decide which LLDP (e.g., historical LLDP or the real-time (or near real-time) LLDP corresponding to the particular lane) to be provided to the lane level routing and navigation module 326, engine, sub-process, and/or the like for each particular lane. At block 908, the lane level routing and navigation module 326 or real-time traffic module 322 may determine, for a particular lane, if the historical LLDP or the real-time (or near real-time) LLDP should be used. For example, the real-time (or near real-time) LLDP for a particular lane may be compared to the historical LLDP for the particular lane and corresponding to an epoch that corresponds to the current time. For example, one or more of the dynamic parameters of the real-time (or near real-time) LLDP for the particular lane may be compared to the corresponding dynamic parameters of the historical LLDP for the particular lane for an epoch corresponding to the current time.

For example, the network apparatus 10 may determine if one or more of the dynamic parameters of the real-time (or near real-time) LLDP for the particular lane and the corresponding dynamic parameters of the historical LLDP for the particular lane for the epoch corresponding to the current time satisfy a similarity threshold requirement. For example, the network apparatus 10 may compare the real-time (or near real-time) value of the dynamic parameter and the historical value of the dynamic parameter to determine if the real-time (or near real-time) LLDP and the historical LLDP satisfy a similarity threshold requirement. For example, the network apparatus 10 may comprise means, such as processor 12, memory 14, and/or the like, for comparing the real-time (or near real-time) value of the dynamic parameter and the historical value of the dynamic parameter to determine if the real-time (or near real-time) value of the dynamic parameter and the historical value of the dynamic parameter satisfy a similarity threshold requirement. In various embodiments, the real-time (or near real-time) value of the dynamic parameter and the historical value of the dynamic parameter may be compared by determining a difference between the real-time (or near real-time) value of the dynamic parameter and the historical value of the dynamic parameter, taking a ratio of the real-time (or near real-time) value of the dynamic parameter and the historical value of the dynamic parameter, and/or the like.

In various embodiments, the similarity threshold requirement may comprise a similarity threshold value or range. In an example embodiment, the similarity threshold value may be a predetermined value or range. For example, in an example embodiment, the real-time (or near real-time) value of the dynamic parameter and the historical value of the dynamic parameter satisfy the similarity threshold requirement when a ratio of the real-time (or near real-time) value of the dynamic parameter and the historical value of the dynamic parameter are within the predetermined range of 0.7 to 1.3, 0.75 to 1.25, 0.8 to 1.2, 0.9 to 1.1, and/or the like. The similarity threshold value or range may also be determined based on a distribution corresponding to the historical value of the dynamic parameter. For example, if the dynamic parameter is representative speed, the historical LLDP information/data may include a representative speed (e.g., mean of the speed distribution) and a standard deviation of the distribution of speeds used to determine the representative speed. For example, the similarity threshold value or range may be defined by a predetermined multiple $\alpha$ (e.g., one, one and a half, two, two and a half, three, and/or the like) of the standard deviation $\sigma$ of the distribution used to determine the historical value of the dynamic parameter. For example, it may be determined that the real-time (or near real-time) value of the dynamic parameter and the historical value of the dynamic parameter satisfy the similarity threshold requirement when the ratio of the real-time (or near real-time) value of the dynamic parameter and the historical value of the dynamic parameter is within the range $\mu-\alpha\sigma$ to $\mu+\pi\sigma$, where $\mu$ is the value of the dynamic parameter. In an example embodiment, the predetermined value or range or the predetermined multiple $\alpha$ is determined based on a class of road corresponding to the particular lane (e.g., based on the map information/data and/or the lane level network graph).

When it is determined that the real-time (or near real-time) value of the dynamic parameter and the historical value of the dynamic parameter do satisfy the similarity threshold requirement, the historical LLDP is used and/or provided. For example, at block 912, the historical value of the dynamic parameter for the particular lane may be used, for example, by the lane level routing and/or navigation module 326 to perform one or more lane level routing and/or navigation functions. When it is determined that the real-time (or near real-time) value of the dynamic parameter and the historical value of the dynamic parameter do not satisfy the similarity threshold requirement, the real-time (or near real-time) LLDP is used and/or provided. For example, at block 910, the real-time (or near real-time) value of the dynamic parameters may be used for the particular lane, for example, by the lane level routing and/or navigation module 326 to perform one or more lane level routing and/or navigation functions.

As previously described, the dynamic parameters of an LLDP may include a representative speed (and possibly a distribution spread measure, such as standard deviation of travel speeds), a sudden braking index, a sudden action index (and/or action index), an incident rate/frequency, a traffic volume measure, and/or the like. FIGS. 10 and 11A provide flowcharts that describe alternative example processes for determining a sudden braking index based on a plurality of instances of probe information/data (e.g., a plurality of sub-trajectories). For example, the processes described by FIGS. 10 and 11A may be performed as part of blocks 808 and/or 906.

Starting at block 1002 of FIG. 10, the deceleration between a pair of instances of probe information/data of sub-trajectories corresponding to a particular lane are determined. For example, the deceleration between a first and second instance of probe information/data, where the first and second instances of probe information/data are part of the same sub-trajectory, may be determined by finding the difference between the speed of the first instance of probe information/data and the speed of the second instance of probe information/data and dividing that difference by the time between when the first instance of probe information/data was captured (e.g., the time stamp of the first instance of probe information/data) and the when the second instance of probe information/data was captured (e.g., the time stamp of the second instance of probe information/data). In an example embodiment, the deceleration may be determined for multiple pairs of probe information/data of one or more sub-trajectories. In an example embodiment, the pairs of instances of probe information/data are adjacent, neighboring, and/or the like such that the corresponding sub-trajectory does not include any instances of probe information/data that are between the pair of instances of probe information/data. In an example embodiment, the sub-trajectory may include one or more instances of probe information/data that are between the pair of instances of probe information/data. For example, the network apparatus 10 may determine deceleration between pairs of instances of probe information/data of sub-trajectories corresponding to a particular lane. For example, the network apparatus 10 may comprise means, such as processor 12, memory 14, and/or the like, for determining deceleration between pairs of instances of probe information/data of sub-trajectories corresponding to a particular lane.

At block 1004, a representative deceleration for the particular lane is determined. For example, a deceleration distribution may be determined based on the decelerations determined from the pairs of instances of probe information/data of one or more sub-trajectories. In an example embodiment, the representative deceleration is an average deceleration (e.g., mean, median, mode, and/or the like) of the deceleration distribution. In an example embodiment, a measurement of spread (e.g., variance, standard deviation, and/or the like) for the deceleration distribution is also determined. For example, the network apparatus 10 may determine a representative deceleration for the particular lane based on the deceleration distribution. For example, the network apparatus 10 may comprise means, such as processor 12, memory 14, and/or the like, for determining a representative deceleration for the particular lane based on the deceleration distribution.

At block 1006, a sudden braking index for the particular lane is determined. In an example embodiment, the sudden braking index for a particular lane is a function of the intensity of deceleration (as represented by the representative deceleration) along the particular lane. For example, the sudden braking index may be determined based on the representative deceleration. In an example embodiment, the sudden braking index for the particular lane is a function of the intensity of deceleration (as represented by the representative deceleration) and the frequency of deceleration. For example, the sudden braking index may be determined based on a ratio of the representative deceleration and a probe volume. In various embodiments, the probe volume is the number of instances of probe information/data considered that were lane level map-matched to the particular lane, the number of decelerations included in the deceleration distribution, the percentage or fraction of decelerations included in the deceleration distribution that were greater than the threshold deceleration, the number of decelerations included in the deceleration distribution that were greater than the threshold deceleration, and/or other measure of the frequency of deceleration along the particular lane. In an example embodiment, the sudden braking index may be determined based on the representative deceleration and a measurement of spread of the deceleration distribution.

For example, the network apparatus 10 may determine the sudden braking index for the particular lane. For example, the network apparatus 10 may comprise means, such as processor 12, memory 14, and/or the like, for determining the sudden braking index for the particular lane. In an example embodiment, the sudden braking index may indicate the intensity with which the sub-trajectories corresponding to the particular lane experienced deceleration. In an example embodiment, the sudden braking index is the representative deceleration determined for the lane. In an example embodiment, the number or percentage of sub-trajectories corresponding to the particular lane in which deceleration occurred is also determined. In an example embodiment, the number or percentage of sub-trajectories corresponding to the particular lane in which deceleration greater than a threshold deceleration occurred is determined. For example, the threshold deceleration may be configured to separate deceleration due to sudden braking and lower intensity deceleration. In various embodiments, the sudden braking index may be saved to an LLDP for the particular lane. In an example embodiment, the sudden braking index, measurement of spread of the deceleration distribution, and/or the number or percentage of sub-trajectories corresponding to the particular lane in which deceleration (possibly greater than a threshold deceleration) occurred are saved to an LLDP for the particular lane. In various embodiments, the LLDP may be a historical LLDP and/or a real-time (or near real-time) LLDP based on when the instances of probe information/data of the sub-trajectories was captured and when the processing of the sub-trajectories occurred.

Similar to FIG. 10, FIG. 11A provides a flowchart illustrating example operations that may be used to determine a sudden braking index, in an example embodiment. Starting at block 1102, the deceleration between pairs of instances of probe information/data of sub-trajectories corresponding to a particular lane are determined. For example, the deceleration between a first and second instance of probe information/data, where the first and second instances of probe information/data are part of the same sub-trajectory, may be determined by finding the difference between the speed of the first instance of probe information/data and the speed of the second instance of probe information/data and dividing that difference by the time between when the first instance of probe information/data was captured (e.g., the time stamp of the first instance of probe information/data) and the when the second instance of probe information/data was captured (e.g., the time stamp of the second instance of probe information/data). In an example embodiment, the deceleration may be determined for multiple pairs of probe information/data of one or more sub-trajectories. In an example embodiment, the pairs of instances of probe information/data are adjacent, neighboring, and/or the like such that the corresponding sub-trajectory does not include any instances of probe information/data that are between the pair of instances of probe information/data. In an example embodiment, the sub-trajectory may include one or more instances of probe information/data that are between the pair of instances of probe information/data. For example, the network apparatus 10 may determine deceleration between pairs of instances of probe information/data of sub-trajectories corresponding to a particular lane. For example, the network apparatus 10 may comprise means, such as processor 12, memory 14, and/or the like, for determining deceleration between pairs of instances of probe information/data of sub-trajectories corresponding to a particular lane.

At block 1104, a clustering analysis may be performed to identify lane sections having high deceleration. For example, the network apparatus 10 may perform a clustering analysis to identify lane sections having high deceleration. For example, the network apparatus 10 may comprise means, such as processor 12, memory 14, and/or the like, for performing a clustering analysis to identify lane sections having high deceleration. For example, as shown in FIG. 11B, a group 1154 of sub-trajectories 1156 corresponding to the particular lane 1150 may be considered at a time. In an example embodiment, the group 1154 comprises two or more sub-trajectories 1156. A high deceleration lane section 1152 may be identified as a section of the lane 1152 where two or more of the sub-trajectories 1156 exhibited a high deceleration. In an example embodiment, a high deceleration is a deceleration that is greater than a threshold deceleration. For example, the threshold deceleration may be configured to separate deceleration due to sudden braking from lower intensity deceleration. For example, as shown in FIG. 11B, each sub-trajectory 1156 of the group 1154 shows a high deceleration between points $P_{B1}$ and $P_{A2}$. Thus, the high deceleration lane section 1152 is defined between points $P_{B1}$ and $P_{A2}$.

Continuing with FIG. 11A, at block 1106, a representative deceleration for the particular lane is determined. For example, a deceleration distribution may be determined based on the decelerations determined from the pairs of instances of probe information/data of one or more sub-trajectories. In an example embodiment, the representative deceleration is an average deceleration (e.g., mean, median, mode, and/or the like) of the deceleration distribution. In an example embodiment, a measurement of spread (e.g., variance, standard deviation, and/or the like) for the deceleration distribution is also determined. For example, the network apparatus 10 may determine a representative deceleration for the particular lane based on the deceleration distribution. For example, the network apparatus 10 may comprise means, such as processor 12, memory 14, and/or the like, for determining a representative deceleration for the particular lane based on the deceleration distribution. In an example embodiment, if the deceleration distribution is multi-modal (e.g., has more than one peak, a broad peak, and/or the like), two or more representative decelerations may be determined. For example, a representative deceleration may be determined for each peak of the deceleration distribution.

At block 1108, a sudden braking index for the particular lane is determined. In an example embodiment, the sudden braking index for a particular lane is a function of the intensity of deceleration (as represented by the representative deceleration) along the particular lane. For example, the sudden braking index may be determined based on the representative deceleration(s). In an example embodiment, the sudden braking index for the particular lane is a function of the intensity of deceleration (as represented by the representative deceleration) and the frequency of deceleration. For example, the sudden braking index may be determined based on a ratio of the representative deceleration and a probe volume. In various embodiments, the probe volume is the number of instances of probe information/data considered that were lane level map-matched to the particular lane, the number of decelerations included in the deceleration distribution, the percentage or fraction of decelerations included in the deceleration distribution that were greater than the threshold deceleration, the number of decelerations included in the deceleration distribution that were greater than the threshold deceleration, and/or other measure of the frequency of deceleration along the particular lane. In an example embodiment, the sudden braking index may be determined based on the representative deceleration(s) and a measurement of spread of the deceleration distribution.

For example, the network apparatus 10 may determine the sudden braking index for the particular lane. For example, the network apparatus 10 may comprise means, such as processor 12, memory 14, and/or the like, for determining the sudden braking index for the particular lane. In an example embodiment, a sudden braking lane section may be assigned a first sudden braking index (e.g., based on a first representative deceleration) and the remainder of the lane may be assigned a second sudden braking index (e.g., based on a second representative deceleration). In an example embodiment, the sudden braking index may indicate the intensity with which the sub-trajectories corresponding to the particular lane experienced deceleration and/or the frequency with which sub-trajectories corresponding to the particular lane experienced deceleration. In an example embodiment, the number or percentage of sub-trajectories corresponding to the particular lane in which deceleration occurred is also determined. In an example embodiment, the number or percentage of sub-trajectories corresponding to the particular lane in which deceleration greater than a threshold deceleration occurred is determined. For example, the threshold deceleration may be configured to separate deceleration due to sudden braking and lower intensity deceleration. In various embodiments, the sudden braking index may be saved to an LLDP for the particular lane. In an example embodiment, the sudden braking index, measurement of spread of the deceleration distribution, and/or the number or percentage of sub-trajectories corresponding to the particular lane in which deceleration (possibly greater than a threshold deceleration) occurred are saved to an LLDP for the particular lane. In various embodiments, the location of one or more sudden braking lane sections along the particular lane may be saved to the LLDP for the particular lane. For example, the location of a sudden braking lane section may be used to provide a user of a mobile apparatus 30 with a sudden braking warning, alert, notification, and/or the like when the mobile apparatus 30 is approaching the sudden braking lane section. In various embodiments, the LLDP may be a historical LLDP and/or a real-time (or near real-time) LLDP based on when the instances of probe information/data of the sub-trajectories were captured and when the processing of the sub-trajectories occurred.

In various embodiments, the network apparatus 10 is configured to perform one or more routing and/or navigation functions using LLDP information/data for one or more lanes. In various embodiments, the one or more routing and/or navigation functions are performed in response to a routing information/data request being received, registered, and/or processed by the network apparatus 10. For example, a mobile apparatus 30 may generate and provide a routing information/data request such that a network apparatus 10 receives the routing information/data request. In various embodiments, the routing information/data request indicates a request for information/data determined through the performance of one or more routing and/or navigation functions. FIG. 12 provides a flowchart illustrating operations for receiving a routing information/data request, performing the corresponding routing and/or navigation functions using LLDP information/data, and providing a response to the routing information/data request.

Starting at block 1202, a routing information/data request is received. For example, a mobile apparatus 30 may generate and provide a routing information/data request such that the network apparatus 10 receives the routing information/data request. For example, a network apparatus 10 may comprise means, such as processor 12, memory 14, communications interface 16, and/or the like, for receiving a routing information/data request. In various embodiments, the routing information/data request includes request navigation and/or route information/data such as a route (e.g., from an origin to a destination), traffic information/data, lane level information/data for one or more upcoming maneuvers, and/or the like. In an example embodiment, the routing information/data request includes an origin location, a destination location, a current location of the mobile apparatus 30, and/or the like.

In various embodiments, a localization module 324, engine, sub-process, and/or the like may receive at least a portion of the routing information/data request and perform one or more localization functions. For example, the localization module 324, engine, sub-process, and/or the like may match the origin location, destination location, current location of the mobile apparatus 30, and/or the like to lanes of the traversable network. The localization module 324, engine, sub-process, and/or the like may provide the localized request information/data to the lane level routing and navigation module 326, engine sub-process, and/or the like. In an example embodiment, the localized request information/data comprises a lane identifier for one or more of the origin location, destination location, and current location of the mobile apparatus 30, speed of the mobile apparatus 30, a timestamp corresponding to the time the request was generated, provided by the mobile apparatus 30, and/or received by the network apparatus 10, and/or the like.

At block 1204, historical and/or real-time LLDP information/data are accessed and/or received for one or more lanes of the traversable network and corresponding to the current time (e.g., real-time and/or near real-time) and/or an epoch corresponding to the current time. For example, the lane level routing and navigation module 326 operating on the network apparatus 10 may receive and/or access historical and/or real-time LLDP information/data. For example, the network apparatus 10 may comprise means, such as processor 12, memory 14, communication interface 16, and/or the like for receiving and/or accessing historical and/or real-time LLDP information/data. For example, the lane level routing and navigation module 326 may receive real-time LLDP information/data provided by the real-time traffic module 322. In an example embodiment, the lane level routing and navigation module 326 may also receive real-time (or near real-time) traffic information/data from the real-time traffic module 322. In various embodiments, the lane level routing and navigation module 326 may receive historical LLDP information/data from the historical LLDP data store 308 via the API 310.

At block 1206, the network apparatus 10 (e.g., the lane level routing and navigation module 326 operating on the network apparatus 10) may use the historical and/or real-time LLDP information/data for performing one or more routing and/or navigation functions based on the routing information/data request. For example, the network apparatus 10 may comprise means, such as processor 12, memory 14, and/or the like, for performing one or more routing and/or navigation functions based on the routing information/data request using the historical and/or real-time LLDP information/data. In an example embodiment, real-time (or near real-time) traffic information/data may be used to update the lane level network graph for use in performing routing and/or navigation functions. For example, if the real-time (or near real-time) traffic information/data indicates that a particular lane of the traversable network is closed (e.g., because of an incident, construction, a festival or event, and/or the like), the lane level network graph may be modified to indicate that the particular lane is not currently available for travel.

In various embodiments, the network apparatus 10 may use the LLDP information/data and/or a portion thereof to determine a cost associated with one or more lanes. For example, the cost for a particular lane may be determined based on one or more dynamic parameters of the LLDP information/data for the particular lane. For example, the representative speed and/or the sudden braking index for a lane may be used as a cost and/or to determine a cost for the lane. In an example embodiment, the cost for the lane is determined based on two or more dynamic parameters of the LLDP corresponding to the lane (and corresponding to an appropriate epoch). The cost associated with the one or more lanes may then be used in a cost-based routing and/or path finding algorithm. For example, an A* algorithm may be used to determine a route (e.g., from an origin to a destination) and/or the like based on costs associated with lanes of a traversable network, wherein the costs are determined from, generated based on, and/or are included in/extracted from the LLDP information/data corresponding to the lanes. In various embodiments, performing the routing and/or navigation function causes routing information/data to be generated. For example, the routing information/data may indicate a route generated based on the performance of the routing and/or navigation function using costs assigned to lanes based on the corresponding LLDP information/data and/or the like. For example, the routing and/or navigation function may be one or more of localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like and the routing information/data may include information/data generated and/or determined via the performance of the routing and/or navigation function.

At block 1208, a response to the routing information/data request is generated. For example, the network apparatus 10 generates a response to the routing information/data request comprising the requested routing information/data generated through performing the routing and/or navigation function using LLDP information/data to assign costs to one or more lanes. The network apparatus 10 may then provide the response to the routing information/data request such that the mobile apparatus 30 that provided the request receives the response. For example, the network apparatus 10 may comprise means, such as processor 12, memory 14, communications interface 16, and/or the like, for generating and providing a response to the routing information/data request such that the mobile apparatus 30 receives the response.

Exemplary Operation of a Mobile Computing Entity

In various embodiments, a mobile apparatus 30 onboard a vehicle 5 generates a routing information/data request. In an example embodiment, a user of the mobile apparatus 30 provides input to the mobile apparatus 30 via a user interface 38 of the mobile apparatus 30 that triggers the generation of the routing information/data request. In an example embodiment, the mobile apparatus 30 may automatically generate the routing information/data request in response to one or more triggers. For example, if the mobile apparatus 30 determines that the mobile apparatus 30 is in motion, the mobile apparatus 30 may automatically generate the routing information/data request. In various embodiments, the routing information/data request includes navigation and/or route information/data such as a route (e.g., from an origin to a destination), traffic information/data, lane level information/data for one or more upcoming maneuvers, and/or the like. In an example embodiment, the routing information/data request includes an origin location, a destination location, a current location of the mobile apparatus 30, and/or the like.

FIG. 13 provides a flowchart illustrating operations performed, such as by the mobile apparatus 30 to generate and provide a routing information/data request and to use a response thereto to perform a navigation function, in accordance with an example embodiment. Starting at block 1302, a mobile apparatus 30 generates and provides a routing information/data request. For example, in response to user input received via user interface 38 and/or in response to an automated trigger, the mobile apparatus 30 generates and provides a routing information/data request. In various embodiments, the routing information/data request includes navigation and/or route information/data such as a route (e.g., from an origin to a destination), traffic information/data, lane level information/data for one or more upcoming maneuvers, and/or the like. In an example embodiment, the routing information/data request includes an origin location, a destination location, a current location of the mobile apparatus 30, and/or the like. In various embodiments, the mobile apparatus 30 provides the request such that the network apparatus 10 receives the request.

At block 1304, the mobile apparatus 30 receives a response to the routing information/data request comprising routing information/data. For example, the mobile apparatus 30 may comprise means, such as processor 32, memory 34, communication interface 36, and/or the like for receiving a response to the routing information/data request comprising routing information/data. For example, a network apparatus 10 may provide a response to the routing information/data request comprising routing information/data such that the mobile apparatus 30 receives the response comprising the routing information/data. In various embodiments, the routing information/data may include a route, information/data indicating a route, traffic information/data (e.g., for providing one or more alerts, warnings, notifications, and/or the like, such as a sudden braking warning alerting a user of the mobile apparatus 30 that the mobile apparatus 30 is approaching a sudden braking lane section), lane level information/data for one or more upcoming maneuvers, and/or the like.

At block 1306, the mobile apparatus 30 uses at least a portion of the routing information/data to perform one or more navigation functions. For example, the mobile apparatus 30 may use the routing information/data to perform one or more navigation functions. For example, the mobile apparatus 30 may comprise means, such as processor 32, memory 34, communication interface 36, user interface 38, and/or the like, for using the routing information/data to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like.

Technical Advantages

Various embodiments of the present invention provide methods, apparatuses, systems, computer program products, and/or the like for performing lane level routing and/or navigation functions using LLDPs. For example, a LLDP may include dynamic parameters such as a representative speed, a sudden braking index, a sudden action index (and/or action index), and/or the like for a lane of a traversable network. The dynamic parameters of an LLDP corresponding to a particular lane may be used to determine and/or assign a cost to the particular lane. The cost may then be used in a cost-based or cost-minimization routing and/or path-finding algorithm. Using such dynamic parameters as a lane level cost in a routing and/or path-finding algorithm may be used to generate routes for new human drivers, automated/self-driving vehicles, and/or other drivers that avoid lanes where sudden braking, sudden lane changes, and/or the like are currently being observed and/or are often observed. The routing and/or pathfinding algorithm may be performed using a lane level network graph.

Thus, various embodiments provide an improvement to the technical art of routing and navigation by providing a technical solution that enables lane level routing based on dynamic parameters of lanes. For example, embodiments of the present invention enable lane level routing based on the representative speed of travel in various lanes or based on the difficulty of driving of a particular route (e.g., as evidenced by a representative speed, a sudden braking index, a sudden action index (and/or action index), an incident rate/frequency, a traffic volume, information/data regarding a lane closure, and/or the like). Additionally, various embodiments of the present invention enable the provision of warnings, alerts, notifications, and/or the like of lane level traffic conditions, such as an upcoming sudden braking lane section. By receiving the warning, alert, notification, and/or the like a human operator of a vehicle, ADAS, and/or automated vehicle may be better prepared for maneuvering through the upcoming sudden braking lane section and/or avoiding other lane level traffic hazards. Thus, various embodiments provide technical improvements to the art of routing and navigation and further improves user experience of a mobile apparatus for use in performing navigation functions.

III. Example Apparatus

The network apparatus 10, probe apparatus 20, and/or mobile apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10, probe apparatus 20, and/or mobile apparatus 30 may be embodied in other types of computing devices, such as a server, a personal computer, a computer workstation, a laptop computer, a plurality of networked computing devices or the like, that are configured to update one or more map tiles, analyze instances of probe information/data for route planning or other purposes. In an example embodiment, a probe apparatus 20 is an in-vehicle navigation system onboard a vehicle 5 or a mobile device; a network apparatus 10 is a server; and a mobile apparatus 30 is a navigation system and/or device, and/or the like. In this regard, FIG. 2A depicts an example network apparatus 10, FIG. 2B depicts an example probe apparatus 20, and FIG. 2C depicts an example mobile apparatus 30 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR;

ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. Similarly, a mobile apparatus 30 of an example embodiment may include, may be associated with, or may otherwise be in communication with a processor 32 and a memory device 34 and optionally a communication interface 36, a user interface 38, one or more sensors 39 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, probe apparatus 20, and/or mobile apparatus 30 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. For example, the processor 22 may be configured to execute computer-executable instructions embedded within a link record of a map tile and/or provided as part of a conflict-resolved travel plan. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, probe apparatus 30, and/or mobile apparatus 30 may include a user interface 18, 28, 38 that may, in turn, be in communication with the processor 12, 22, 32 to provide output to the user, such as one or more potential DFC corridors and the corresponding rankings, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34, and/or the like).

The network apparatus 10, probe apparatus 20, and/or mobile apparatus 30 may optionally include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, probe apparatus 20, and/or mobile apparatus 30 of an example embodiment, a navigation system may also include or have access to a geographic database that includes a variety of data (e.g., map information/data, at least a portion of a lane level network graph representing at least a portion of the traversable network) utilized in constructing a route or navigation path, determining the time to traverse the route or navigation path, matching a geolocation (e.g., a GNSS determined location) to a point on a map, a lane of a lane network, and/or link, and/or the like. For example, a geographic database may include a lane level network graph and/or portion thereof, lane data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, lane data records, POI data records, and/or other data records. In an example embodiment, the network apparatus 10 may be configured to modify, update, and/or the like one or more data records of the geographic database. For example, the network apparatus 10 may modify, update, generate, and/or the like a lane level network graph and/or the corresponding data records, a localization layer and/or the corresponding data records, and/or the like.

In an example embodiment, the connection information/data and/or road segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a traversable network, such as used by vehicles, cars, pedestrians, bicyclists, and/or other entities. Similarly, the nodes and connection information/data of the lane level network graph represent a lane network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database (e.g., the lane level network graph) may be generated and/or updated based on information/data provided by a plurality of non-dedicated probe apparatuses. For example, the probe apparatuses may be onboard vehicles owned and/or operated by and/or on behalf of members of the general public such that, for example, new drives used to generate and/or update the lane level network graph may be crowdsourced.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, probe apparatus 20, and/or mobile apparatus 30 in accordance with an example embodiment may determine the time to traverse a route that includes one or more turns at respective intersections more accurately.

IV. Apparatus, Methods, and Computer Program Products

As described above, FIGS. 7-10, 11A, and 12-13 illustrate flowcharts of a network apparatus 10, probe apparatus 20, and/or mobile apparatus 30, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving, by processing circuitry of a network apparatus, one or more lane level dynamic profiles, each lane level dynamic profile comprising at least one dynamic parameter corresponding to at least one lane of a traversable network, wherein the at least one dynamic parameter of at least one lane level dynamic profile comprises a sudden braking index and wherein determining the sudden braking index includes performing a clustering analysis of sub-trajectories corresponding to the at least one lane to identify sudden braking lane sections;
receiving, by the processing circuitry, a lane level network graph for at least a portion of the traversable network;
assigning, by the processing circuitry, a cost to the at least one lane based on the at least one dynamic parameter corresponding to the at least one lane;
performing, by the processing circuitry, a routing or navigation function using the cost assigned to the at least one lane and the lane level network graph to generate routing information; and
providing, by the network apparatus, the routing information such that a mobile apparatus receives the routing information.

2. The method of claim 1, further comprising receiving a routing information request from the mobile apparatus, wherein the routing or navigation function is performed based on the routing information request.

3. The method of claim 1, further comprising:
receiving real-time or near real-time traffic information; and
modifying the lane level network graph based on the real-time or near real-time traffic information, wherein the routing or navigation function is performed based on the modified lane level network graph.

4. The method of claim 1, wherein the at least one dynamic parameter comprises at least one of (a) a representative speed, (b) a sudden braking index, (c) a sudden action index, or (d) an action index.

5. The method of claim 1, wherein the lane level dynamic profile is determined based on at least one of (a) historical probe information corresponding to an epoch corresponding to a current time or (b) real-time or near real-time probe information corresponding to a sliding time window corresponding to the current time.

6. The method of claim 1, wherein the routing or navigation function comprises determining a lane level route from an origin location to a destination location.

7. The method of claim 1, wherein performing the routing or navigation function comprises using a cost-based routing or path-finding algorithm.

8. The method of claim 7, wherein the cost-based routing or path-finding algorithm is an A* algorithm.

9. The method of claim 1, wherein the routing information comprises information identifying a location of a sudden braking lane section.

10. An apparatus comprising at least one processor, a communications interface configured for communicating via at least one network, and at least one memory storing computer program code, the at least one memory and the computer program code configured to, with the processor, cause the apparatus to at least:

receive one or more lane level dynamic profiles, each lane level dynamic profile comprising at least one dynamic parameter corresponding to at least one lane of a traversable network, wherein the at least one dynamic parameter of at least one lane level dynamic profile comprises a sudden braking index and wherein determining the sudden braking index includes performing a clustering analysis of sub-trajectories corresponding to the at least one lane to identify sudden braking lane sections;

receive a lane level network graph for at least a portion of the traversable network;

assign a cost to the at least one lane based on the at least one dynamic parameter corresponding to the at least one lane;

perform a routing or navigation function using the cost assigned to the at least one lane and the lane level network graph to generate routing information; and provide the routing information such that a mobile apparatus receives the routing information.

11. The apparatus of claim 10, wherein the at least one memory and the computer program code are further configured to, with the processor, cause the apparatus to at least receive a routing information request from the mobile apparatus, wherein the routing or navigation function is performed based on the routing information request.

12. The apparatus of claim 10, wherein the at least one memory and the computer program code are further configured to, with the processor, cause the apparatus to at least:

receive real-time or near real-time traffic information; and modify the lane level network graph based on the real-time or near real-time traffic information, wherein the routing or navigation function is performed based on the modified lane level network graph.

13. The apparatus of claim 10, wherein the at least one dynamic parameter comprises at least one of (a) a representative speed, (b) a sudden braking index, (c) a sudden action index, or (d) an action index.

14. The apparatus of claim 10, wherein the lane level dynamic profile is determined based on at least one of (a) historical probe information corresponding to an epoch corresponding to a current time or (b) real-time or near real-time probe information corresponding to a sliding time window corresponding to the current time.

15. The apparatus of claim 10, wherein the routing or navigation function comprises determining a lane level route from an origin location to a destination location.

16. The apparatus of claim 10, wherein performing the routing or navigation function comprises using a cost-based routing or path-finding algorithm.

17. The apparatus of claim 10, wherein the routing information comprises information identifying a location of a sudden braking lane section.

18. A computer program product comprising at least one non-transitory computer-readable storage medium having computer-readable program code portions stored therein, the computer-readable program code portions comprising executable portions configured, when executed by a processor of an apparatus, to cause the apparatus to:

receive one or more lane level dynamic profiles, each lane level dynamic profile comprising at least one dynamic parameter corresponding to at least one lane of a traversable network, wherein the at least one dynamic parameter of at least one lane level dynamic profile comprises a sudden braking index and wherein determining the sudden braking index includes performing a clustering analysis of sub-trajectories corresponding to the at least one lane to identify sudden braking lane sections;

receive a lane level network graph for at least a portion of the traversable network;

assign a cost to the at least one lane based on the at least one dynamic parameter corresponding to the at least one lane;

perform a routing or navigation function using the cost assigned to the at least one lane and the lane level network graph to generate routing information; and provide the routing information such that a mobile apparatus receives the routing information.

19. The method of claim 1, wherein the at least one dynamic parameter comprises an action index for the at least one lane, wherein the action index for the at least one lane is a representation of at least one of (a) frequency and intensity of decelerations exhibited along the at least one lane and (b) frequency of lane changes into and/or out of the at least one lane.

20. The method of claim 19, wherein determining the action index for the at least one lane comprises analyzing sub-trajectories corresponding to the at least one lane to identify at least one of (a) frequency of decelerations, (b) intensity of decelerations, or (c) frequency of lane changes into and/or out of the at least one lane.

* * * * *